United States Patent
Kanaya

(10) Patent No.: US 10,491,478 B2
(45) Date of Patent: Nov. 26, 2019

(54) WIRELESS COMMUNICATION SYSTEM, COMMUNICATION METHOD, INFORMATION PROCESSING APPARATUS, AND STORAGE MEDIUM HAVING STORED THEREIN INFORMATION PROCESSING PROGRAM

(71) Applicant: NINTENDO CO., LTD., Kyoto (JP)

(72) Inventor: Takumi Kanaya, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 132 days.

(21) Appl. No.: 15/698,061

(22) Filed: Sep. 7, 2017

(65) Prior Publication Data

US 2018/0254954 A1 Sep. 6, 2018

(30) Foreign Application Priority Data

Mar. 2, 2017 (JP) ................................. 2017-039241

(51) Int. Cl.
*H04L 12/24* (2006.01)
*H04L 12/751* (2013.01)
(Continued)

(52) U.S. Cl.
CPC ...... *H04L 41/0893* (2013.01); *H04L 41/0809* (2013.01); *H04L 41/0816* (2013.01);
(Continued)

(58) Field of Classification Search
CPC ............... H04L 41/0893; H04L 15/765; H04L 41/0809; H04L 41/0816; H04L 41/0886;
(Continued)

(56) References Cited

U.S. PATENT DOCUMENTS 5,323,315 A * 6/1994 Highbloom .......... G06Q 40/025
235/379
5,603,081 A * 2/1997 Raith .................... H04B 7/2643
455/435.3

(Continued)

FOREIGN PATENT DOCUMENTS

JP 2008-011093 1/2008
JP 2011-114765 6/2011

(Continued)

OTHER PUBLICATIONS

Smar technology company, Industrial Networks—Part 2, Jul. 2017, http://www.smar.com/en/technical-article/industrial-networks-part-2, pp. 1-9.*

(Continued)

*Primary Examiner* — Lisa C Lewis
*Assistant Examiner* — Raied A Salman
(74) *Attorney, Agent, or Firm* — Nixon & Vanderhye PC

(57) ABSTRACT

A master apparatus includes, in an action frame for connection, acceptance policy regarding acceptance of a slave apparatus, and transmits the action frame. After establishment of connection with the slave apparatus, the master apparatus transmits a disconnection request to the slave apparatus. After having been disconnected from the master apparatus, the slave apparatus determines whether or not to reconnect to the master apparatus, on the basis of the acceptance policy included in the action frame from the master apparatus, and the disconnection request received from the master apparatus. Upon determining that reconnection is not possible, the slave apparatus does not transmit a participation request to the master apparatus.

18 Claims, 19 Drawing Sheets

(51) Int. Cl.
*H04L 12/12* (2006.01)
*H04L 29/06* (2006.01)

(52) U.S. Cl.
CPC ...... *H04L 41/0886* (2013.01); *H04L 41/0889* (2013.01); *H04L 45/02* (2013.01); *H04L 12/12* (2013.01); *H04L 63/102* (2013.01)

(58) Field of Classification Search
CPC ..... H04L 41/0889; H04L 45/02; H04L 12/12; H04L 63/102; H04W 4/001; H04W 76/023; H04W 4/008; G06F 3/0482; G06T 1/0007
USPC ....... 726/1; 709/222, 228; 380/270; 370/338
See application file for complete search history.

(56) References Cited

U.S. PATENT DOCUMENTS

| | | | | |
|---|---|---|---|---|
| 5,742,677 | A * | 4/1998 | Pinder | H04L 63/0428 348/E5.004 |
| 5,995,623 | A * | 11/1999 | Kawano | G06F 21/10 380/277 |
| 7,263,596 | B1 | 8/2007 | Wideman et al. | |
| 7,757,294 | B1 * | 7/2010 | Simkins | G06F 21/10 726/26 |
| 9,351,098 | B2 * | 5/2016 | Rivera | G06F 21/44 |
| 10,129,922 | B2 * | 11/2018 | Nogawa | H04W 76/19 |
| 10,164,858 | B2 * | 12/2018 | Gunasekara | H04L 43/0811 |
| 2002/0183905 | A1 * | 12/2002 | Maeda | B62D 41/00 701/33.4 |
| 2003/0093669 | A1 | 5/2003 | Morais et al. | |
| 2005/0195975 | A1 | 9/2005 | Kawakita | |
| 2006/0155439 | A1 * | 7/2006 | Slawinski | G07C 5/0858 701/33.4 |
| 2007/0069921 | A1 * | 3/2007 | Sefton | G08G 1/0175 340/932.2 |
| 2007/0118752 | A1 * | 5/2007 | Kiessling | G06F 21/305 713/176 |
| 2007/0204321 | A1 | 8/2007 | Shen et al. | |
| 2008/0003951 | A1 | 1/2008 | Kuwahara et al. | |
| 2008/0025512 | A1 * | 1/2008 | Nakajima | H04W 12/02 380/270 |
| 2010/0234071 | A1 * | 9/2010 | Shabtay | H04B 7/0408 455/562.1 |
| 2011/0128946 | A1 | 6/2011 | Saito et al. | |
| 2011/0231508 | A1 | 9/2011 | Torii | |
| 2012/0051314 | A1 | 3/2012 | Goyal et al. | |
| 2012/0215874 | A1 | 8/2012 | Sequeira et al. | |
| 2013/0031248 | A1 | 1/2013 | Demura et al. | |
| 2013/0132854 | A1 * | 5/2013 | Raleigh | G06F 3/0482 715/738 |
| 2013/0230173 | A1 * | 9/2013 | Hori | G08G 1/092 380/281 |
| 2013/0261839 | A1 * | 10/2013 | Meyer | G07C 5/0808 701/1 |
| 2014/0032916 | A1 * | 1/2014 | Costin | H04L 9/3236 713/176 |
| 2014/0201126 | A1 * | 7/2014 | Zadeh | G06N 7/005 706/52 |
| 2014/0210646 | A1 * | 7/2014 | Subramanya | B61L 29/28 340/928 |
| 2015/0065055 | A1 * | 3/2015 | Newham | H04W 52/0251 455/41.3 |
| 2015/0179033 | A1 * | 6/2015 | Birk | G08B 13/1427 340/572.1 |
| 2015/0331422 | A1 * | 11/2015 | Hartung | G05D 1/021 701/23 |
| 2015/0334113 | A1 * | 11/2015 | Angus | H04L 63/0428 713/168 |
| 2016/0078253 | A1 * | 3/2016 | Frank | G06F 21/79 726/26 |
| 2017/0085447 | A1 * | 3/2017 | Chen | G06F 16/248 |
| 2017/0147356 | A1 * | 5/2017 | Kotary | G06F 21/575 |
| 2017/0193026 | A1 * | 7/2017 | Pettovello | G06F 12/1408 |
| 2017/0201850 | A1 * | 7/2017 | Raleigh | H04W 4/50 |
| 2017/0202035 | A1 | 7/2017 | Yokoyama et al. | |
| 2017/0215069 | A1 | 7/2017 | Nakajima | |
| 2017/0244565 | A1 * | 8/2017 | Bronk | H04L 63/126 |
| 2017/0352215 | A1 * | 12/2017 | Maiwand | G07C 9/00896 |
| 2018/0013723 | A1 * | 1/2018 | Kirk | H04L 63/0272 |
| 2018/0084412 | A1 * | 3/2018 | Alfred | H04L 9/088 |

FOREIGN PATENT DOCUMENTS

| | | | |
|---|---|---|---|
| JP | 2013-026993 | | 2/2013 |
| JP | 2016131313 A | * | 1/2015 |
| JP | 2016131313 A | * | 7/2016 |

OTHER PUBLICATIONS

Kanaya, et al., U.S. Appl. No. 15/697,986, filed Sep. 7, 2017 (74 pages).
Kanaya, et al., U.S. Appl. No. 15/697,833, filed Sep. 7, 2017 (77 pages).
Extended European Search Report dated Feb. 26, 2018 issued in European Application No. 17188286.3 (9 pgs.).
Wikipedia, "Address Resolution Protocol," retrieved Sep. 3, 2019, 7 pages https://en.wikipedia.org/wiki/Address_Resolution_Protocol#cite_note-7.

* cited by examiner

ARP TABLE

| IP ADDRESS | MAC ADDRESS | USER NAME | |
|---|---|---|---|
| 111.111.0.1 | MAC ADDRESS OF MASTER APPARATUS | USER A | ← NODE DATA 1 |
| 111.111.0.2 | MAC ADDRESS OF SLAVE APPARATUS 1 | USER B | ← NODE DATA 2 |
| 111.111.0.3 | MAC ADDRESS OF SLAVE APPARATUS 2 | USER C | ← NODE DATA 3 |
| ⋮ | ⋮ | ⋮ | |

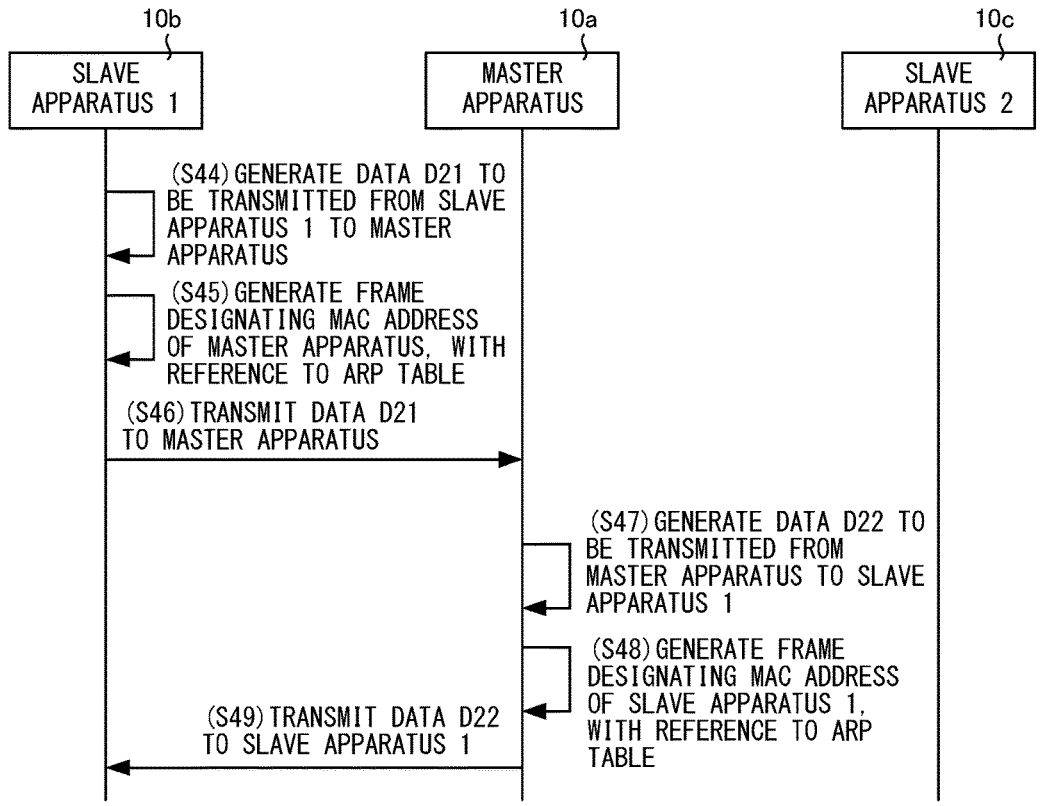
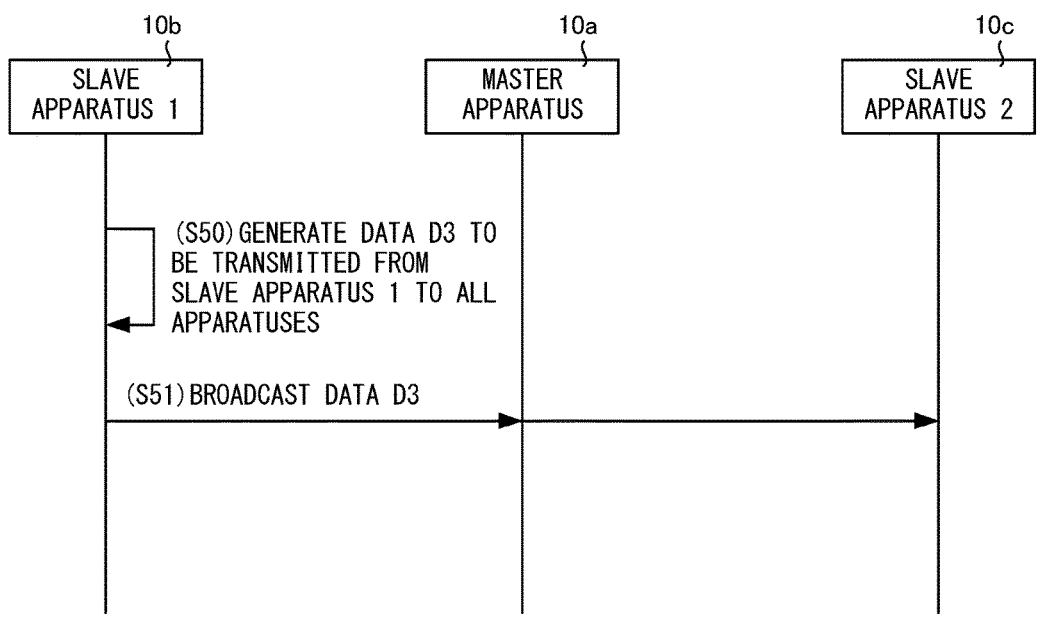

F I G. 1 2 A

| OPERATION MODE | OPERATION OF MASTER APPARATUS | VALUE OF ACCEPTANCE POLICY |
|---|---|---|
| PERMISSION | ALWAYS ACCEPT SLAVE APPARATUS | PERMISSION (0) |
| REJECTION | ALWAYS REJECT ACCEPTANCE OF SLAVE APPARATUS | REJECTION (1) |
| WHITE LIST | ACCEPT RECONNECTION OF SLAVE APPARATUS HAVING BEEN SUDDENLY DISCONNECTED | WHITE LIST (2) |
| BLACK LIST | REJECT RECONNECTION OF SLAVE APPARATUS HAVING BEEN INTENTIONALLY DISCONNECTED | BLACK LIST (3) |

F I G. 1 2 B

| VALUE OF ACCEPTANCE POLICY | OPERATION OF SLAVE APPARATUS UPON RECEIVING ACTION FRAME |
|---|---|
| PERMISSION (0) | DISPLAY MASTER APPARATUS HAVING TRANSMITTED ACTION FRAME, AS CONNECTION DESTINATION CANDIDATE |
| REJECTION (1) | DO NOT DISPLAY MASTER APPARATUS HAVING TRANSMITTED ACTION FRAME, AS CONNECTION DESTINATION CANDIDATE |
| WHITE LIST (2) | DISPLAY THAT RECONNECTION IS POSSIBLE, OR AUTOMATICALLY RECONNECT |
| BLACK LIST (3) | DO NOT DISPLAY MASTER APPARATUS HAVING TRANSMITTED ACTION FRAME, AS CONNECTION DESTINATION CANDIDATE |

F I G. 1 3
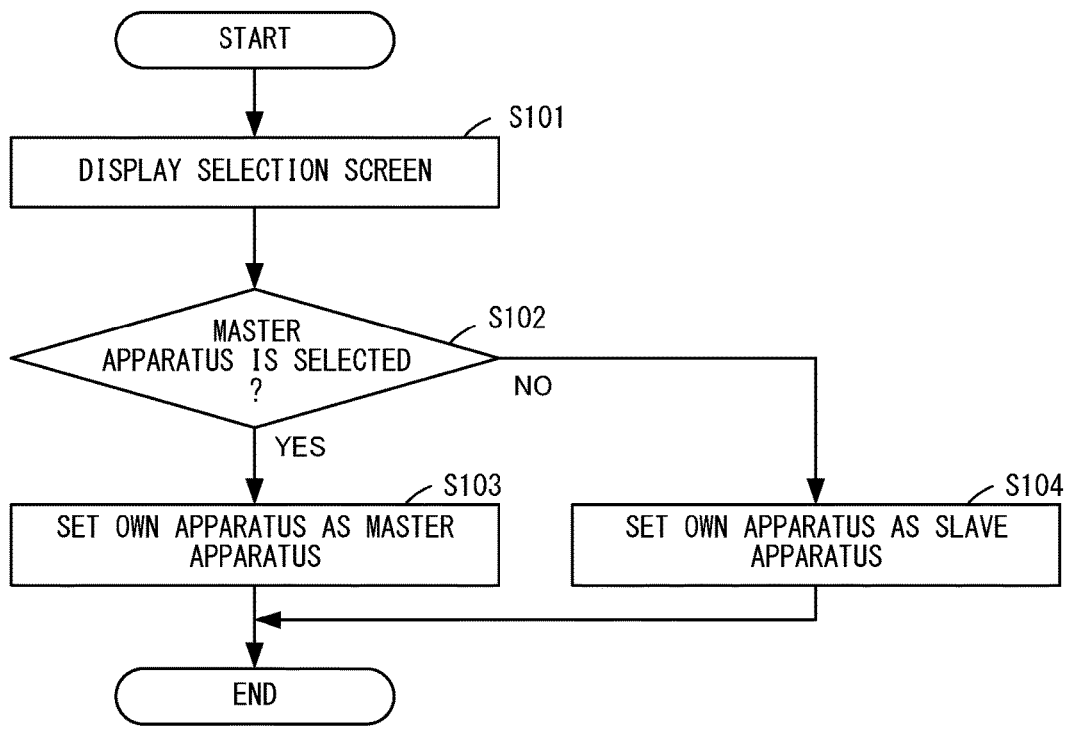

WIRELESS COMMUNICATION SYSTEM, COMMUNICATION METHOD, INFORMATION PROCESSING APPARATUS, AND STORAGE MEDIUM HAVING STORED THEREIN INFORMATION PROCESSING PROGRAM

CROSS REFERENCE TO RELATED APPLICATION

The disclosures of Japanese Patent Application No. 2017-039241, filed on Mar. 2, 2017, are incorporated herein by reference.

FIELD

The technology herein relates to wireless communication systems, communication methods, information processing apparatuses, and storage media having stored therein information processing programs.

BACKGROUND AND SUMMARY

Conventionally, there is a wireless communication system in which a user of a slave apparatus, which has received beacons transmitted from master apparatuses, selects a master apparatus, the slave apparatus transmits a participation request to the selected master apparatus, and the slave apparatus is allowed to participate in a group when the master apparatus permits the participation request.

In the conventional technique described above, however, the slave apparatus merely transmits the participation request to the master apparatus selected by the user. Therefore, there is room for improvement in controlling participation of apparatuses by inhibiting useless communication.

Therefore, an object of the exemplary embodiments is to provide a wireless communication system capable of controlling participation of apparatuses while inhibiting useless communication.

In the exemplary embodiments, in order to attain the object described above, the following configuration examples are exemplified.

An exemplary embodiment is a wireless communication system including a plurality of information processing apparatuses each having a wireless communication function. The wireless communication system includes a first information processing apparatus and a second information processing apparatus. The first information processing apparatus executes: a connection information transmitting process of transmitting information for establishing connection with the second information processing apparatus; a connection process of establishing connection between the first information processing apparatus and the second information processing apparatus; and a disconnection request transmitting process of transmitting a disconnection request to the second information processing apparatus being connected thereto. The second information processing apparatus executes: a connection information receiving process of receiving, from the first information processing apparatus, the information for establishing connection; a connection process of establishing connection between the first information processing apparatus and the second information processing apparatus; a disconnection request receiving process of receiving the disconnection request from the first information processing apparatus; and a determination process of determining whether or not to reconnect to the first information processing apparatus, based on the disconnection request and the information for establishing connection, after having been disconnected from the first information processing apparatus.

According to the above configuration, the second information processing apparatus can determine whether or not to reconnect to the first information processing apparatus, based on the disconnection request, and the information for establishing connection which is received from the first information processing apparatus. Thus, useless connection requests from the second information processing apparatus to the first information processing apparatus can be inhibited.

In another configuration, the first information processing apparatus, in the connection information transmitting process, may broadcast the information for establishing connection.

According to the above configuration, the first information processing apparatus can transmit the information for establishing connection to a large number of apparatuses at the same time.

In another configuration, the second information processing apparatus may execute a display control process of causing a display to display connection destination candidates, based on the information for establishing connection which is received in the connection information receiving process. Upon determining not to reconnect to the first information processing apparatus in the determination process, the second information processing apparatus, in the display control process, may cause the display to display information of information processing apparatuses each having transmitted the information for establishing connection, excluding the first information processing apparatus.

According to the above configuration, upon determining not to reconnect to the first information processing apparatus, the second information processing apparatus can display, as connection destination candidates, apparatuses other than the first information processing apparatus.

In another configuration, upon determining not to reconnect to the first information processing apparatus in the determination process, the second information processing apparatus may not automatically transmit a reconnection request to the first information processing apparatus.

According to the above configuration, transmission of reconnection requests to the first information processing apparatus can be inhibited.

In another configuration, the first information processing apparatus, in the connection information transmitting process, may repeatedly transmit the information for establishing the connection. The first information processing apparatus, in the disconnection request transmitting process, may transmit the disconnection request when a disconnection condition is satisfied.

According to the above configuration, the first information processing apparatus can transmit a disconnection request only when the disconnection condition is satisfied, while repeatedly transmitting the information for establishing the connection.

In another configuration, in the connection information transmitting process, the first information processing apparatus may transmit first information as the information for establishing connection before the disconnection request is transmitted, and may transmit second information different from the first information, as the information for establishing connection, after the disconnection request is transmitted.

According to the above configuration, the first information processing apparatus can transmit the first information before the disconnection request is transmitted, and can transmit the second information after the disconnection request is transmitted. For example, before the disconnection request is transmitted, the first information processing apparatus can transmit the first information indicating that connection thereto is permitted, and after the disconnection request is transmitted, the first information processing apparatus can transmit the second information indicating that connection thereto is conditionally permitted.

In another configuration, the first information processing apparatus, in the disconnection request transmitting process, may transmit the disconnection request in accordance with an operation performed by a user of the first information processing apparatus.

According to the above configuration, the first information processing apparatus can transmit the disconnection request to the second information processing apparatus in accordance with an operation performed by the user.

In another configuration, the first information processing apparatus, in the connection information transmitting process, may transmit, as the information for establishing connection, any one of information indicating permission of connection, information indicating rejection of connection, and information indicating conditional permission/rejection of connection.

According to the above configuration, the first information processing apparatus can transmit the information indicating that connection thereto is conditionally permitted or rejected, as well as the information indicating that connection thereto is permitted and the information indicating that connection thereto is rejected.

In another configuration, the second information processing apparatus, in the determination process, may determine whether or not to reconnect to the first information processing apparatus, based on the disconnection request and the information indicating conditional permission/rejection of connection.

According to the above configuration, for example, upon receiving the information indicating the conditional permission/rejection of connection, the second information processing apparatus can determine whether or not to reconnect to the first information processing apparatus, based on the disconnection request as well as the information indicating the conditional permission/rejection of connection.

In another configuration, the second information processing apparatus may transmit a connection request to the first information processing apparatus, upon determining to reconnect to the first information processing apparatus in the determination process. The first information processing apparatus stores therein a list of information processing apparatuses to which the first information processing apparatus has transmitted the disconnection request. The first information processing apparatus may determine whether or not the second information processing apparatus having transmitted the connection request is included in the list, and may reject reconnection of the second information processing apparatus when the second information processing apparatus is included in the list.

According to the above configuration, the first information processing apparatus stores therein the list (e.g., black list) of apparatuses to which the first information processing apparatus has transmitted disconnection requests. Upon receiving a connection request from the second information processing apparatus, the first information processing apparatus can determine, based on the list, whether or not to permit reconnection of the second information processing apparatus. Thus, even when the first information processing apparatus receives a connection request from the second information processing apparatus to which the first information processing apparatus has transmitted a disconnection request, the first information processing apparatus can surely reject reconnection of the apparatus.

In another configuration, the first information processing apparatus and the second information processing apparatus each may store therein connection identification information for identifying the connection established in the connection process. The second information processing apparatus, in the determination process, may determine whether or not to reconnect to the first information processing apparatus, based on the connection identification information as well as the disconnection request and the information for establishing connection.

According to the above configuration, the second information processing apparatus can determine whether or not to reconnect to the first information processing apparatus, also based on the connection identification information. For example, when connection between the first information processing apparatus and the second information processing apparatus is established, connection identification information for identifying this connection is generated, and the connection identification information is stored even after disconnection therebetween. For example, based on the stored connection identification information, the second information processing apparatus can determine whether or not the first information processing apparatus that has transmitted the information for establishing connection is an apparatus to which the second information processing apparatus has been connected just before the disconnection, and can determine whether or not to reconnect to the first information processing apparatus, based on the result of the determination.

Another exemplary embodiment may be a communication method performed in the wireless communication system. Still another exemplary embodiment may be a first information processing apparatus or a second information processing apparatus included in the wireless communication system. Yet another exemplary embodiment may be a storage medium having stored therein an information processing program executed in the first information processing apparatus or the second information processing apparatus.

A further exemplary embodiment is a wireless communication system including a plurality of information processing apparatuses each having a wireless communication function. The wireless communication system includes a first information processing apparatus and a second information processing apparatus. The first information processing apparatus executes: a transmission process of transmitting any one of: connection permission information indicating that connection of another information processing apparatus is permitted; connection rejection information indicating that connection of another information processing apparatus is rejected, and conditional connection permission/rejection information indicating that connection of another information processing apparatus is conditionally permitted or rejected. The second information processing apparatus executes: a reception process of receiving the information transmitted by the first information processing apparatus in the transmission process; a connection determining process of determining whether or not to connect to the first information processing apparatus, based on the information received in the reception process; and a condition determining process of determining whether or not a predetermined condition is satisfied. In the connection determining process, the second information processing apparatus determines to connect to the first information processing apparatus upon receiving the connection permission information, determines not to connect to the first information processing apparatus upon receiving the connection rejection information, and determines to connect to the first information processing apparatus upon receiving the conditional connection permission/rejection information, when the predetermined condition is satisfied.

According to the exemplary embodiments, useless connection requests from the second information processing apparatus to the first information processing apparatus can be inhibited.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 is an example non-limiting diagram illustrating a flow of processing in the case where data is transmitted by unicast between the slave apparatus 1 and the master apparatus;

FIG. 9 is an example non-limiting diagram illustrating a flow of processing in the case where the slave apparatus 1 transmits data D3 by broadcast to other apparatuses;

FIG. 12A is an example non-limiting diagram illustrating an example of an operation mode of the master apparatus;

FIG. 12B is an example non-limiting diagram illustrating an example of an operation of a slave apparatus that has received the action frame;

FIG. 13 is an example non-limiting flowchart illustrating details of processing for setting an information processing apparatus 10 as a master apparatus or a slave apparatus;

DETAILED DESCRIPTION OF NON-LIMITING EXAMPLE EMBODIMENTS

Figure 1:
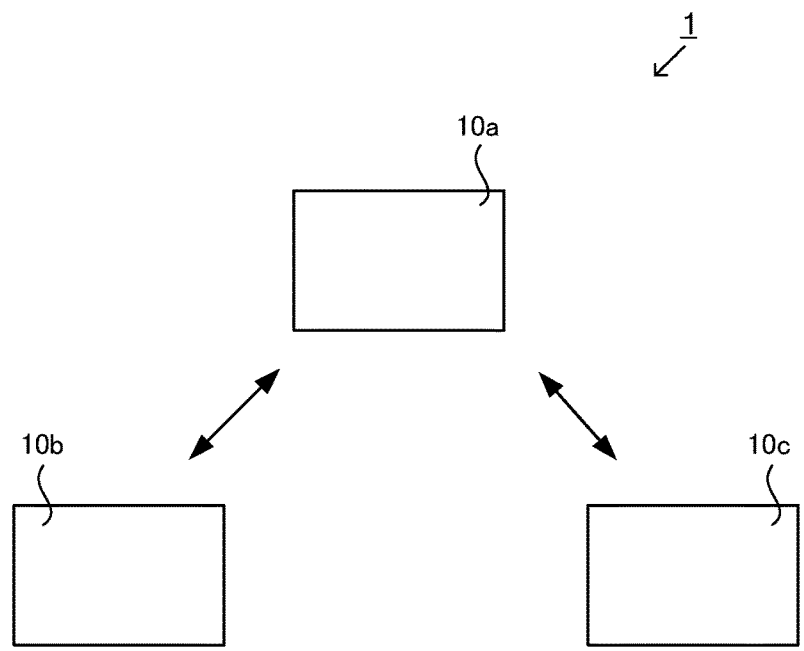
FIG. 1 is an example non-limiting diagram illustrating an example of a wireless communication system 1 according to an embodiment.

A wireless communication system according to an example of an embodiment will be described. FIG. 1 is a diagram illustrating an example of a wireless communication system 1 according to the embodiment. As shown in FIG. 1, the example of the wireless communication system 1 includes a plurality of information processing apparatuses 10a to 10c. Hereinafter, the information processing apparatuses 10a to 10c may be generally referred to as an information processing apparatus 10.

The information processing apparatus 10 is an information processing apparatus capable of performing wireless communication, and is capable of performing communication based on a wireless LAN standard such as IEEE 802.11n, for example. The information processing apparatus 10 is communicable with another information processing apparatus 10 via a network shown in FIG. 1. In addition, the information processing apparatus 10 is connectable to the Internet or another network via another wireless LAN access point, for example.

The respective information processing apparatuses 10 are used by different users. Examples of the information processing apparatus 10 may include: a hand-held game apparatus; a stationary game apparatus; a personal computer; a tablet terminal; a smartphone; etc. The information processing apparatus 10 is capable of executing any application. The plurality of information processing apparatuses 10 may be of the same model, or of different models.

Among the plurality of information processing apparatuses 10, one information processing apparatus 10 serves as a master apparatus, and the other one or plurality of information processing apparatuses 10 serve as slave apparatuses. Thus, one network is established by one master apparatus and at least one slave apparatus. For example, in FIG. 1, the information processing apparatus 10a serves as a master apparatus, and the information processing apparatuses 10b and 10c serve as slave apparatuses.

A master apparatus and a slave apparatus are capable of performing wireless communication with each other, and a slave apparatus is capable of performing wireless communication with another slave apparatus via the master apparatus (or not via the master apparatus). FIG. 1 merely shows an example. The number of apparatuses included in the wireless communication system 1 may be three or more, or may be two.

Figure 2:
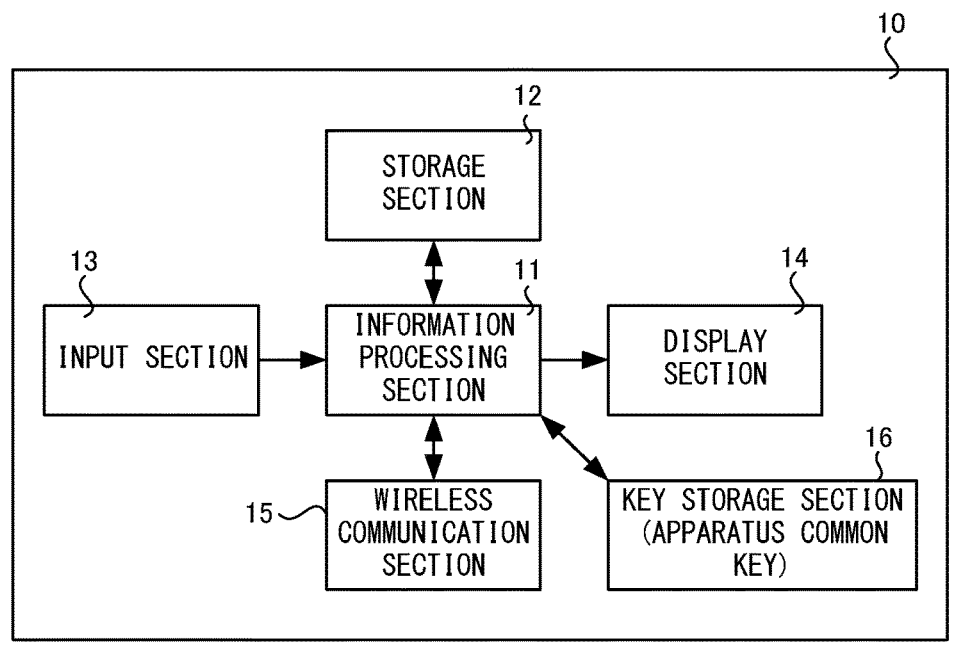
FIG. 2 is an example non-limiting block diagram illustrating an example of a functional structure of an information processing apparatus 10.

FIG. 2 is a block diagram illustrating an example of a functional structure of the information processing apparatus 10. As shown in FIG. 2, the information processing apparatus 10 includes an information processing section 11, a storage section 12, an input section 13, a display section 14, a wireless communication section 15, and a key storage section 16.

The information processing section 11 includes a CPU (Central Processing Unit), a DRAM, a GPU (Graphics Processing Unit), etc. The information processing section 11 is capable of executing, for example, an information processing program (game application program, another application program, or the like) stored in the storage section 12. Further, the information processing section 11 is capable of executing an information processing program obtained via the network, and an information processing program stored in another external storage medium.

The storage section 12 is, for example, a non-volatile memory or a hard disk, and stores therein a predetermined information processing program. The input section 13 receives an input performed by a user. Examples of the input section 13 may include: buttons; direction indication keys; a touch panel; a sensor (e.g., inertial sensor) for detecting an orientation and/or a motion of the information processing apparatus 10; etc.

The display section 14 is a display unit for displaying characters and/or images. Examples of the display section 14 may include: a liquid crystal display unit; and an organic EL display unit.

The wireless communication section 15 performs wireless communication with an external apparatus via the network. In the present embodiment, the wireless communication section 15 performs communication with the outside in accordance with a method based on a wireless LAN standard such as 802.11n or the like.

The key storage section 16 is hardware that provides a secure storage area for an apparatus common key. The apparatus common key is a key used for encryption and decryption, and common to the plurality of information processing apparatuses 10. The information processing section 11 can obtain the key by giving a parameter to the key storage section 16, but cannot read the apparatus common key itself. That is, the apparatus common key is written in hardware so as not to be easily extracted by software.

The plurality of information processing apparatus 10 are connected to the network shown in FIG. 1, and are capable of executing a predetermined communication application (e.g., communication game application). Any application other than game applications may be executed among the plurality of information processing apparatuses 10. Hereinafter, a description will be given of a case where the plurality of information processing apparatuses 10 communicate with each other to execute a communication game application.

Figure 3:
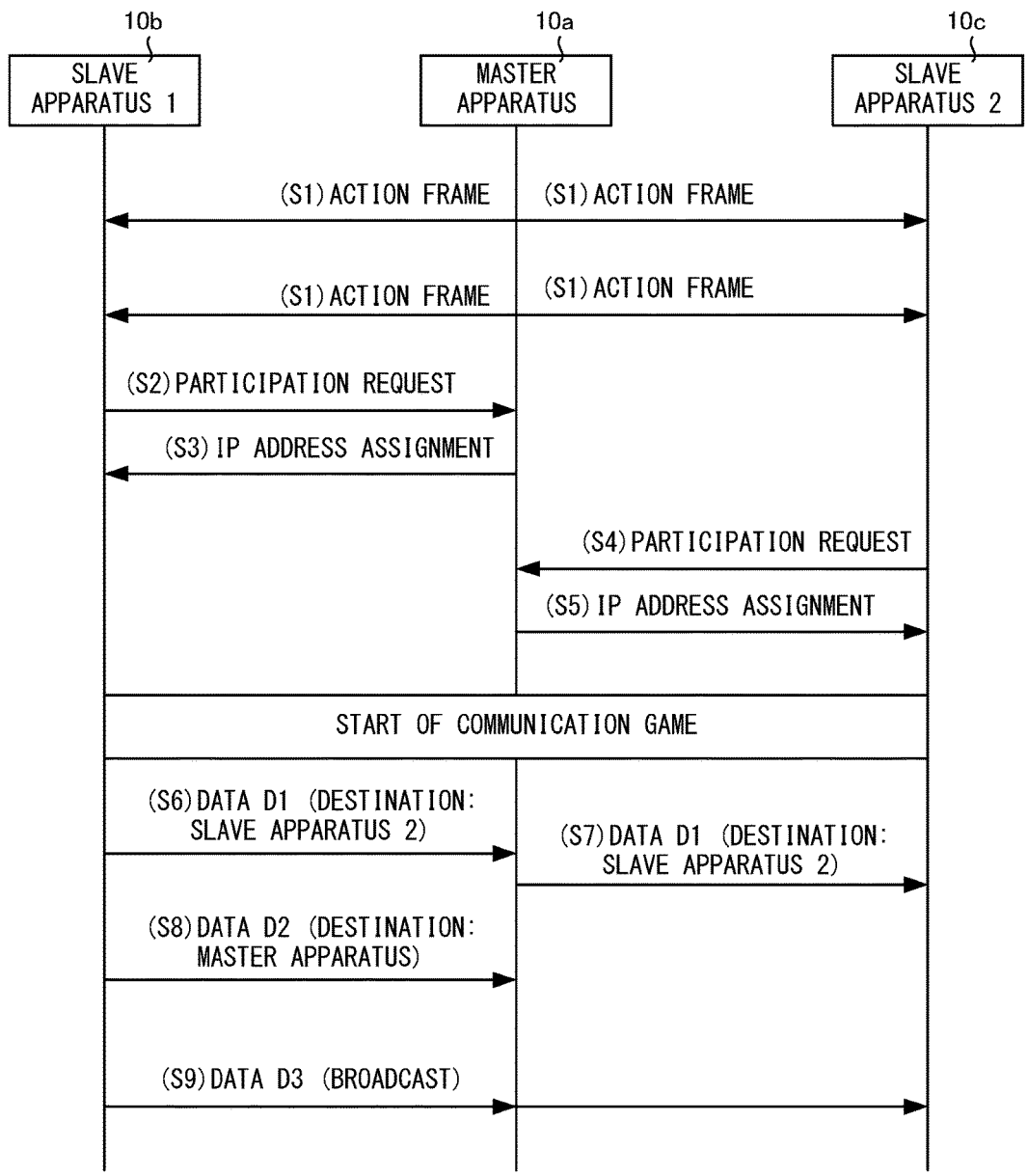
FIG. 3 is an example non-limiting diagram illustrating an outline of communication in the case where a communication game application is executed among information processing apparatuses 10a to 10c.

FIG. 3 is a diagram illustrating an outline of communication when the communication game application is executed among the information processing apparatuses 10a to 10c.

It is assumed that, among the plurality of information processing apparatuses 10a to 10c, the information processing apparatus 10a is set as a master apparatus, and the information processing apparatuses 10b and 10c are set as slave apparatuses. Initially, no wireless connection is established among the information processing apparatuses 10a to 10c. After wireless connection is established among the information processing apparatuses 10a to 10c, a communication game is started among these information processing apparatuses 10a to 10c.

Specifically, as shown in FIG. 3, the information processing apparatus 10a serving as a master apparatus transmits, by broadcast, an action frame at predetermined time intervals (S1). For example, the information processing apparatus 10a transmits the action frame every 100 msec. The action frame is a kind of a management frame in a wireless LAN. Although described in detail later, the action frame is a frame for transmitting, to the surrounding apparatuses, information for establishing wireless connection (in other words, information for participation in the communication game performed among the plurality of devices). In addition, the action frame also has a function to notify the slave apparatuses participating in the communication game of information of slave apparatuses currently participating in the communication game. The action frame includes: information of the master apparatus (IP address, MAC address, etc.); identification information of the communication game application; information of the slave apparatuses participating in the communication game; etc. The action frame is also used for transmitting other pieces of information to peripheral apparatuses at the same time. For example, the action frame, when being transmitted, may include information specific to an application (e.g., IDs of items and images used for the application, information regarding the execution state of the application, etc.).

Upon receiving the action frame transmitted from the master apparatus, the information processing apparatus 10b (slave apparatus 1) transmits a request for participation in the communication game to the master apparatus (S2). Upon receiving the participation request from the slave apparatus 1, the master apparatus gives an IP address to the slave apparatus 1 (S3). At this point in time, wireless connection is established between the master apparatus and the slave apparatus 1 (the slave apparatus 1 participates in the network of the communication game).

Likewise, upon receiving the action frame transmitted from the master apparatus, the information processing apparatus 10c (slave apparatus 2) transmits a request for participation in the communication game to the master apparatus (S4). Upon receiving the participation request from the slave apparatus 2, the master apparatus gives an IP address to the slave apparatus 2 (S5). At this point in time, wireless connection is established between the master apparatus and the slave apparatus 2. Thereafter, upon receiving the action frame from the master apparatus, the slave apparatus 1 and the slave apparatus 2 can obtain information of the master apparatus and information of the slave apparatuses, whereby communication is allowed among the information processing apparatuses 10a to 10c, and the communication game is started.

While the communication game is being executed among the information processing apparatuses 10a to 10c, these information processing apparatuses 10a to 10c communicate with each other. For example, when the slave apparatus 1 transmits predetermined data D1 to the slave apparatus 2, the slave apparatus 1 designates the slave apparatus 2 as a destination of the data D1, and transmits the data D1 to the master apparatus (S6). The master apparatus transfers the data D1 to the slave apparatus 2 (S7). Thus, when the slave apparatus 1 transmits data to another slave apparatus, i.e., the slave apparatus 2, by unicast, the slave apparatus 1 transmits the data via the master apparatus to the slave apparatus 2.

When the slave apparatus 1 transmits predetermined data D2 to the master apparatus, the slave apparatus 1 designates the master apparatus as a destination of the data D2, and transmits the data D2 to the master apparatus (S8). Thus, when the slave apparatus transmits data to the master apparatus, the slave apparatus transmits the data to the master apparatus by unicast.

When the slave apparatus 1 transmits data D3 to all the information processing apparatuses 10 (specifically, the master apparatus and the slave apparatus 2) in the network, the slave apparatus 1 transmits the data D3 by broadcast (S9).

Figure 4:
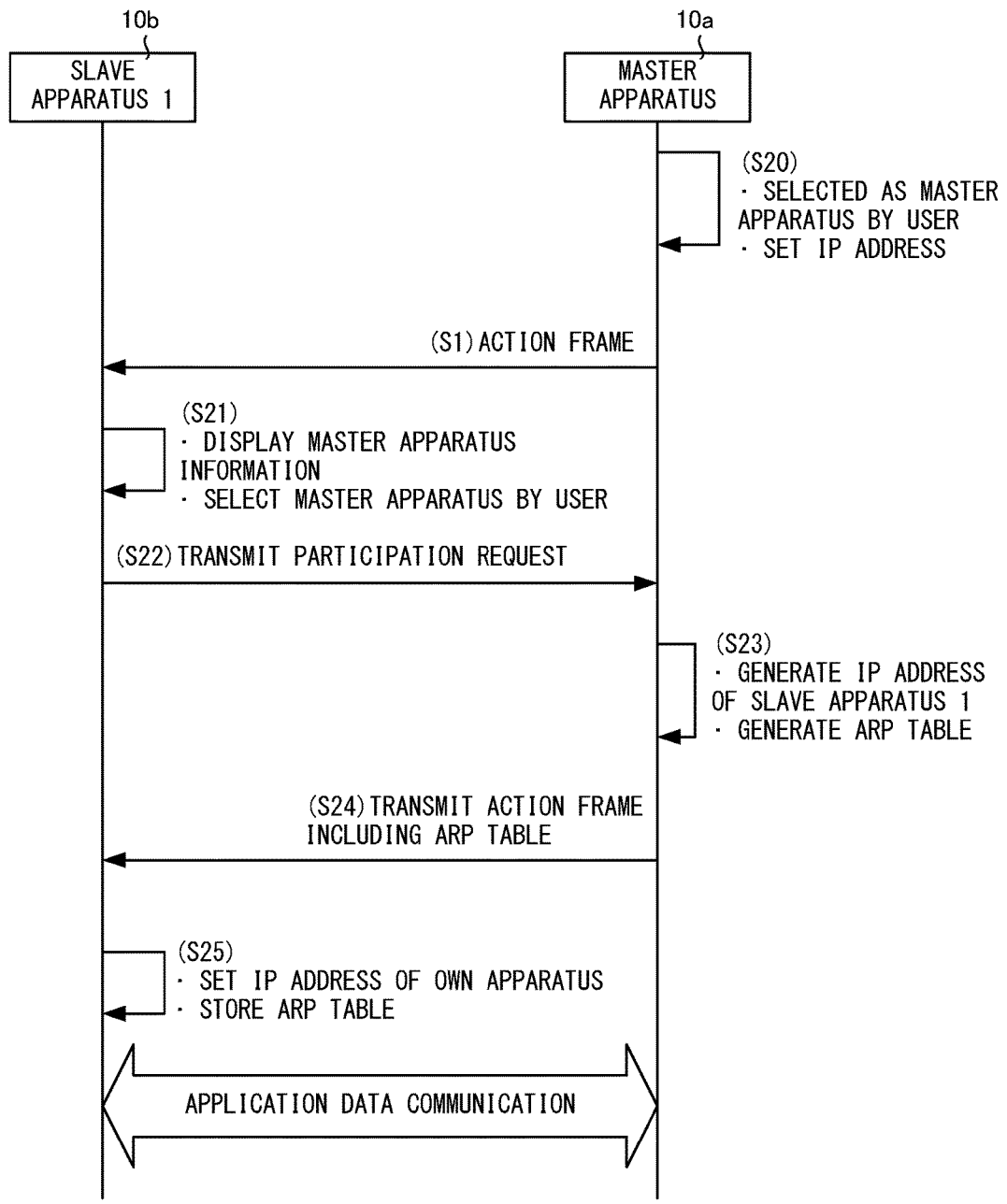
FIG. 4 is an example non-limiting diagram illustrating a flow of processing until wireless connection between a master apparatus and a slave apparatus 1 is established.

Next, a description will be given of a specific flow of processing until establishment of connection between the master apparatus and the slave apparatus 1 in FIG. 3. FIG. 4 is diagram illustrating a flow of processing until establishment of wireless connection between the master apparatus and the slave apparatus 1.

As shown in FIG. 4, in the information processing apparatus 10a, the information processing apparatus 10a is set as a master apparatus according to selection of the user (S20). For example, when an instruction to execute the communication game application is made in the information processing apparatus 10a, an image that allows the user to select whether or not the information processing apparatus 10a is to be a master apparatus is displayed on a screen of the display section 14 of the information processing apparatus 10a. When being selected to be a master apparatus by the user, the information processing apparatus 10a sets itself as a master apparatus, and sets an IP address thereof. At this time, the master apparatus sets the IP address thereof without transmitting a frame (Gratuitous ARP) for confirming duplication of the IP address.

Specifically, the information processing apparatus 10a randomly sets a network portion of the IP address, and sets a host portion of the IP address to "1". For example, the information processing apparatus 10a sets "111.111.0.1" as the IP address. In the IP address, the first to third octets ("111.111.0") correspond to the network portion, and the fourth octet ("1") corresponds to the host portion. In the network portion, the first and second octets ("111.111") are fixed, and the third octet is randomly determined.

When the information processing apparatus 10a is set as a master apparatus, the information processing apparatus 10a transmits an action frame by broadcast (S1). The master apparatus repeatedly transmits the action frame at predetermined time intervals. Specifically, the master apparatus repeatedly transmits the action frame at predetermined time intervals even while the master apparatus is accepting participation of slave apparatuses in the communication game, and even after the master apparatus has stopped accepting participation in the communication game and started the communication game.

Meanwhile, the information processing apparatus 10b, which has not been set as a master apparatus, operates as a slave apparatus 1. Upon receiving the action frame from the master apparatus, the slave apparatus 1 displays information of the master apparatus on the display section 14 thereof (S21). Upon receiving the action frame from the master apparatus existing in the neighborhood, the slave apparatus 1 extracts, for example, the MAC address, the user name (host name), and the IP address of the master apparatus, and information regarding the game application, which are included in the action frame. Then, the slave apparatus 1 displays these pieces of information on the display section 14 as master apparatus information. When a plurality of master apparatuses exist in the neighborhood of the slave apparatus 1, the slave apparatus 1 displays master apparatus information for each of the plurality of master apparatuses.

When any one of the one or a plurality of master apparatus information displayed in the slave apparatus 1 is selected by the user, the slave apparatus 1 transmits a participation request to the selected master apparatus (S22). This participation request includes the MAC address of the slave apparatus 1.

Upon receiving the participation request from the slave apparatus 1, the master apparatus generates an IP address of the slave apparatus 1, and generates an ARP table (S23). Specifically, the master apparatus assigns IP addresses to slave apparatuses in the order in which the slave apparatuses have transmitted the participation requests, thereby preventing duplication of the IP addresses among the plurality of apparatuses. The master apparatus generates the IP address of the slave apparatus 1 without transmitting a frame (Gratuitous ARP) for confirming duplication of the IP address. For example, the master apparatus assigns "111.111.0.2" as an IP address to the slave apparatus 1 that has transmitted the participation request first. The ARP table is a table in which IP addresses are associated with MAC addresses. In S23, an ARP table is generated in which the IP address of the master apparatus is associated with the MAC address thereof, and the IP address of the slave apparatus 1 is associated with the MAC address thereof. An example of the ARP table will be described later with reference to FIG. 6.

Next, the master apparatus includes the generated ARP table in the action frame, and transmits the action frame by broadcast (S24). Upon receiving the action frame, the slave apparatus 1 sets the IP address thereof on the basis of the ARP table included in the action frame (S25). At this time, the slave apparatus 1 sets the IP address thereof without transmitting a frame (Gratuitous ARP) for confirming duplication of the IP address. In addition, the slave apparatus 1 stores the ARP table included in the action frame, in a storage unit thereof (e.g., a memory in the wireless communication section 15, a DRAM in the information processing section 11, or the storage section 12). Thus, wireless connection is established between the master apparatus and the slave apparatus 1, thereby enabling transmission/reception of application data (referred to as "application data communication") to be used for execution of the communication game application between these apparatuses.

In S22, authentication may be performed between the master apparatus and the slave apparatus 1 in response to that the participation request has been transmitted from the slave apparatus 1. For example, authentication based on a pass phrase determined in advance may be performed between the master apparatus and the slave apparatus 1. Alternatively, open authentication may be performed between the master apparatus and the slave apparatus 1. When wireless LAN authentication has succeeded between the master apparatus and the slave apparatus 1, the master apparatus may generate an IP address of the slave apparatus 1. In addition, when wireless LAN authentication has succeeded between the master apparatus and the slave apparatus 1, the master apparatus may generate an ARP table (a table in which the IP address of the master apparatus is associated with the MAC address thereof, and the IP address of the slave apparatus 1 is associated with the MAC address thereof).

Figure 5:
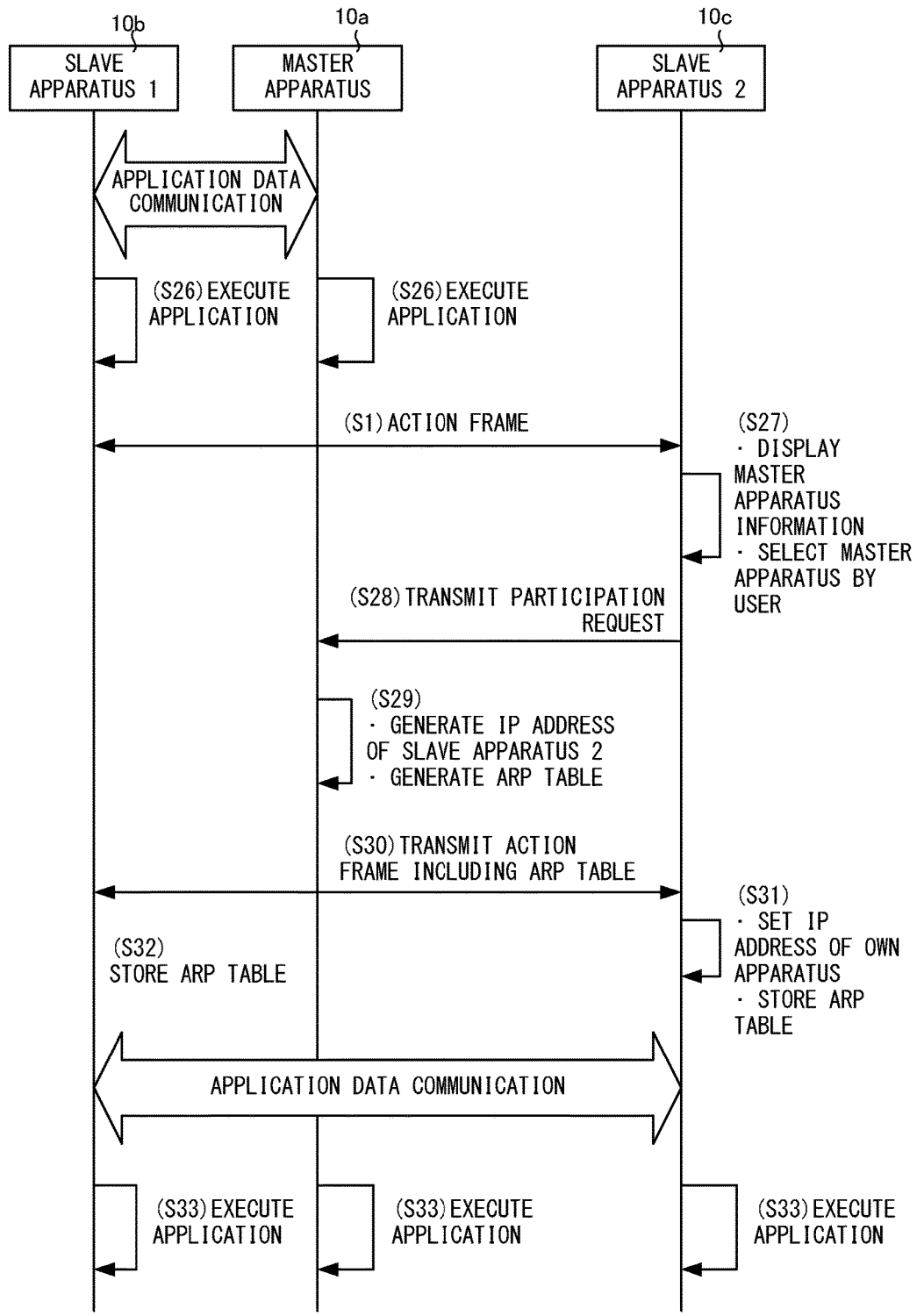
FIG. 5 is an example non-limiting diagram illustrating a flow of processing until a communication game is performed among three apparatuses after establishment of wireless connection between the master apparatus and a slave apparatus 2.

Next, a description will be given of a flow of processing, which follows the processing shown in FIG. 4, until the communication game is performed among the three apparatuses after establishment of wireless connection between the master apparatus and the slave apparatus 2. FIG. 5 is a diagram illustrating the flow of processing until the communication game is performed among the three apparatuses after establishment of wireless connection between the master apparatus and the slave apparatus 2.

As shown in FIG. 5, application data communication is performed between the master apparatus and the slave apparatus 1, and the communication game application is executed on the basis of data exchanged in the application data communication (S26). For example, when the communication game has been started between the master apparatus and the slave apparatus 1, data according to inputs to the input sections 13 of the master apparatus and the slave apparatus 1 are exchanged through the application data communication. On the basis of the exchanged data, the game application is executed in the master apparatus and the slave apparatus 1. If the communication game to be performed among the plurality of information processing apparatuses 10 has not been started and the master apparatus is accepting participation of another slave apparatus, predetermined data is exchanged between the master apparatus and the slave apparatus 1 until the communication game is started, and the application is executed on the basis of the data. For example, until the communication game is started, a message may be transmitted from the master apparatus to the slave apparatus 1 (or from the slave apparatus 1 to the master apparatus), or items may be exchanged between the master apparatus and the slave apparatus 1.

Even while the application data communication is being performed between the master apparatus and the slave apparatus 1, the master apparatus transmits the action frame at predetermined time intervals (S1). Upon receiving the action frame from the master apparatus, the information processing apparatus 10c (slave apparatus 2) displays the master apparatus information on the display section 14 thereof, and accepts selection of a master apparatus by the user (S27). Since the action frame from the master apparatus includes the ARP table described above, the slave apparatus 2 can obtain, in addition to the master apparatus information, information of the slave apparatus 1 which is connected to the master apparatus (which participates in the communication game). Therefore, in S27, the slave apparatus 2 may display, in addition to the master apparatus information, the information of the slave apparatus 1 currently participating in the communication game.

When a master apparatus is selected in the slave apparatus 2, the slave apparatus 2 transmits a participation request to the master apparatus (S28). This participation request includes the MAC address of the slave apparatus 2. Upon receiving the participation request from the slave apparatus 2, the master apparatus generates an IP address of the slave apparatus 2, and generates an ARP table (S29). The master apparatus generates the IP address of the slave apparatus 2 without transmitting a frame (Gratuitous ARP) for confirming duplication of the IP address. For example, the master apparatus assigns "111.111.0.3" as an IP address to the slave apparatus 2 that has transmitted the participation request second. Further, the master apparatus generates an ARP table in which the IP address of the master apparatus is associated with the MAC address thereof, the IP address of the slave apparatus 1 is associated with the MAC address thereof, and the IP address of the slave apparatus 2 associated with the MAC address thereof.

Then, the master apparatus includes the generated ARP table in the action frame, and transmits the action frame by broadcast (S30). Upon receiving the action frame, the slave apparatus 2 sets the IP address thereof on the basis of the ARP table included in the action frame, and stores the ARP table in the storage unit thereof (S31).

The slave apparatus 1 also receives the action frame, and stores the ARP table included in the action frame, in the storage unit thereof (S32). Thus, a network is established among the three apparatuses 10a to 10c, thereby enabling application data communication. Thus, the ARP table that has been stored in the slave apparatus 1 connected to the master apparatus is updated in accordance with participation of the slave apparatus 2.

For example, when instruction to start the communication game is made in the master apparatus, application data communication is performed among the three apparatuses 10a to 10c, and the communication game application is executed among the three apparatuses 10a to 10c (S33). For example, in the case where a game is performed in which characters A to C corresponding to the three apparatuses 10a to 10c, respectively, move in the same game space, the respective characters A to C move in the game space in accordance with inputs to the input sections 13 of the respective apparatuses. In this case, for example, data according to the input to the input section 13 of the slave apparatus 1 is transmitted to the master apparatus and the slave apparatus 2. The master apparatus and the slave apparatus 2 execute the game application on the basis of the data transmitted from the slave apparatus 1, thereby updating the position of the character B corresponding to the slave apparatus 1.

Figures 6, 7:
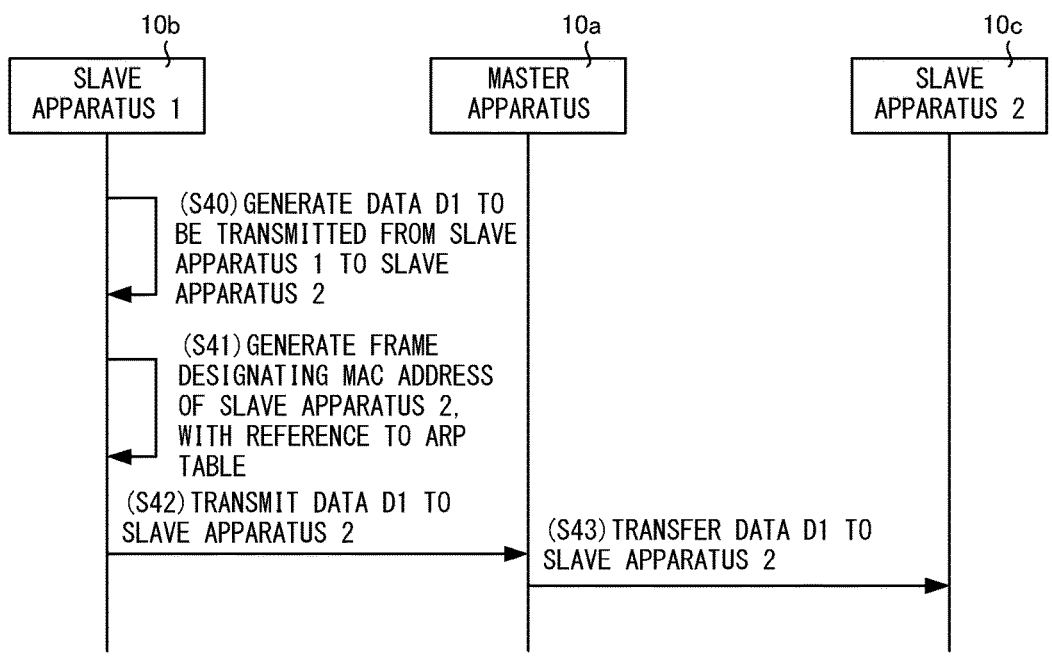
FIG. 6 is an example non-limiting diagram illustrating an example of an ARP table included in an action frame transmitted from the master apparatus.
FIG. 7 is an example non-limiting diagram illustrating a flow of processing in the case where data D1 is transmitted by unicast from the slave apparatus 1 to the slave apparatus 2.

FIG. 6 is a diagram illustrating an example of the ARP table included in the action frame transmitted from the master apparatus. As shown in FIG. 6, when the master apparatus, the slave apparatus 1, and the slave apparatus 2 exist in the network, the ARP table includes node data 1 in which the IP address of the master apparatus, the MAC address of the master apparatus, and the user name (host name) of the master apparatus are associated with each other. The ARP table further includes node data 2 in which the IP address of the slave apparatus 1, the MAC address of the slave apparatus 1, and the user name (host name) of the slave apparatus 1 are associated with each other. The ARP table further includes node data 3 in which the IP address of the slave apparatus 2, the MAC address of the slave apparatus 2, and the user name (host name) of the slave apparatus 2 are associated with each other.

FIG. 6 shows an example of the ARP table in the case where two slave apparatuses are connected to the master apparatus. In the case where three slave apparatuses are connected to the master apparatus, an ARP table including node data 4 in addition to the node data 1 to 3 is generated and broadcast by the master apparatus. There is an upper limit for the number of slave apparatuses that can be connected to one master apparatus at the same time. The upper limit number of connectable slave apparatuses may be a predetermined number (e.g., "8"), or may be a number that varies depending on the type of the communication game application to be executed. Alternatively, the upper limit number of connectable slave apparatuses may be determined depending on the communication status. Still alternatively, the upper limit number of connectable slave apparatuses may be determined according to the number of other peripheral apparatuses connected to the master apparatus. For example, as other peripheral apparatuses, wireless controllers may be wirelessly connected to the master apparatus, and the upper limit number of connectable slave apparatuses may be determined according to the number of the wireless controllers connected to the master apparatus. The wireless communication standard between the master apparatus and the peripheral apparatuses may be different from or the same as the wireless communication standard between the master apparatus and the slave apparatuses. For example, wireless communication between the master apparatus and the peripheral apparatuses may be performed based on the standard of Bluetooth (registered trademark).

When any one of the plurality of slave apparatuses participating in the communication game withdraws from the game, the master apparatus deletes the node data corresponding to the slave apparatus that has withdrawn, to update the ARP table. The master apparatus includes the updated ARP table in an action frame to be transmitted next, and transmits the action frame. Thus, the slave apparatuses participating in the communication game can recognize the slave apparatus that has withdrawn from the game.

Next, a description will be given of communication performed among the information processing apparatuses 10a to 10c (the master apparatus, the slave apparatus 1, and the slave apparatus 2) after wireless connection has been established among these information processing apparatuses.

FIG. 7 is a diagram illustrating a flow of processing in the case where data D1 is transmitted by unicast from the slave apparatus 1 to the slave apparatus 2.

As shown in FIG. 7, the slave apparatus 1 generates the data D1 to be transmitted to the slave apparatus 2 (S40). As an exemplary case of transmitting data by unicast from the slave apparatus 1 to the slave apparatus 2, there is a case of individually transmitting a message from the user of the slave apparatus 1 to the user of the slave apparatus 2. For example, in the case where user B of the slave apparatus 1 transmits a predetermined message only to user C of the slave apparatus 2 while the communication game is being executed, the user B creates the message addressed to the user C by using the input section 13 of his/her own information processing apparatus 10b. Specifically, when the message has been created by the user B, the game application of the slave apparatus 1 creates the data D1 corresponding to the created message. At this time, the game application of the slave apparatus 1 designates the IP address of the slave apparatus 2 as an address of the slave apparatus 2.

The (information processing section 11 of) slave apparatus 1, with reference to the ARP table, obtains the MAC address of the slave apparatus 2 corresponding to the IP address designated by the game application. Then, the information processing section 11 of the slave apparatus 1 instructs the wireless communication section 15 to transmit the data D1 with the obtained MAC address of the slave apparatus 2 being designated. In response to this instruction, the wireless communication section 15 generates a frame including the data D1 (S41).

Next, the wireless communication section 15 of the slave apparatus 1 transmits, to the master apparatus, the data frame including the data D1 to be transmitted to the slave apparatus 2 (S42). Specifically, the wireless communication section 15 of the slave apparatus 1 wirelessly transmits the frame, with the MAC address of the slave apparatus 1 being designated as a source address, the MAC address of the slave apparatus 2 being designated as a destination address, the MAC address of the master apparatus being designated as a receiver, and the MAC address of the slave apparatus 1 being designated as a transmitter.

Upon receiving the frame, the master apparatus transfers the frame to the slave apparatus 2 (S43). Specifically, the wireless communication section 15 of the master apparatus wirelessly transmits the data frame, with the MAC address of the slave apparatus 1 being designated as a source address, the MAC address of the slave apparatus 2 being designated as a destination address, the MAC address of the slave apparatus 2 being designated as a receiver, and the MAC address of the master apparatus being designated as a transmitter.

Upon receiving the data frame from the master apparatus, the slave apparatus 2 determines, from the destination address, that the data is addressed to the slave apparatus 2, and extracts the data D1 included in the frame. Then, the slave apparatus 2 executes the game application on the basis of the data D1. For example, the slave apparatus 2 displays the message according to the data D1 on the display section 14.

As described above, when individually transmitting data from the slave apparatus 1 to the slave apparatus 2, the slave apparatus 1 transmits the data via the master apparatus to the slave apparatus 2. The slave apparatus 1 designates the MAC address of the slave apparatus 2 with reference to the ARP table that has been transmitted from the master apparatus and stored in the slave apparatus 1. Since the ARP table transmitted from the master apparatus in advance is stored in the slave apparatus 1, the slave apparatus 1 can know the MAC address of the slave apparatus 2 even if the slave apparatus 1 does not transmit, to the network, an ARP (Address Resolution Protocol) for obtaining the MAC address of the slave apparatus 2 from the IP address of the slave apparatus 2. Thus, the slave apparatus 1 can transmit the data to the slave apparatus 2 without performing extra communication, and delay can be reduced.

When transmitting data to the slave apparatus 2, the application of the slave apparatus 1 designates the IP address of the slave apparatus 2. As viewed from the application side, communication with another apparatus can be performed by using the IP address, without being conscious of the MAC address of the other apparatus. Therefore, for example, by interposing a router that routes two networks, a communication application can be executed between two apparatuses connected to different IP networks. For example, assuming that there are network A (111.111.0.0) constructed by master apparatus A, slave apparatus A1, and slave apparatus A2 and network B (111.111.1.0) constructed by master apparatus B and slave apparatus B1, such a router enables communication between the slave apparatus A1 in the network A and the slave apparatus B1 in the network B. In this case, routing may be performed by a router apparatus different from the information processing apparatus 10, or the information processing apparatus 10 (e.g., the master apparatus) may have a routing function.

In the example shown in FIG. 7, when the slave apparatus 1 transmits the data to the slave apparatus 2 by unicast, the slave apparatus 1 transmits the data via the master apparatus. That is, the master apparatus and the plurality of slave apparatuses in the network are configured to operate in the infrastructure mode. In another embodiment, when the slave apparatus 1 transmits data to the slave apparatus 2 by unicast, the slave apparatus 1 may directly transmit the data to the slave apparatus 2. That is, the master apparatus and the plurality of slave apparatuses in the network may be configured to operate in the ad hoc mode. Specifically, the slave apparatus 1 specifies the MAC address of the slave apparatus 2 corresponding to the IP address of the slave apparatus 2, with reference to the ARP table. The slave apparatus 1 designates the specified MAC address of the slave apparatus 2, and directly transmits the data to the slave apparatus 2.

FIG. 8 is a diagram illustrating a flow of processing in the case where data is transmitted by unicast between the slave apparatus 1 and the master apparatus.

As shown in FIG. 8, the slave apparatus 1 generates data D21 to be transmitted to the master apparatus (S44). As an exemplary case of transmitting data by unicast from the slave apparatus 1 to the master apparatus, there is a case of individually transmitting a message from the user of the slave apparatus 1 to the user of the master apparatus as described above. Specifically, the game application of the slave apparatus 1 generates the data D21 addressed to the master apparatus, and designates the IP address of the master apparatus.

The information processing section 11 of the slave apparatus 1, with reference to the ARP table, specifies the MAC address of the master apparatus corresponding to the IP address designated by the game application, and instructs the wireless communication section 15 to transmit the data D21 with the specified MAC address of the master apparatus being designated. Then, the wireless communication section 15 of the slave apparatus 1 generates a data frame including the data D21 (S45).

Next, the wireless communication section 15 of the slave apparatus 1 transmits, to the master apparatus, the frame including the data D21 addressed to the master apparatus (S46). Specifically, the wireless communication section 15 of the slave apparatus 1 wirelessly transmits the data frame, with the MAC address of the slave apparatus 1 being designates as a source address, the MAC address of the master apparatus being designates as a destination address, the MAC address of the master apparatus being designates as a receiver, and the MAC address of the slave apparatus 1 being designated as a transmitter.

Upon receiving the frame from the slave apparatus 1, the master apparatus determines, from the destination address, that the data is addressed to the master apparatus, and extracts the data D21 included in the frame. Then, the master apparatus executes the game application on the basis of the data D21.

The processing flow in the case where the master apparatus individually transmits data D22 to the slave apparatus 1 is similar to that described above. As an exemplary case of transmitting data by unicast from the master apparatus to the slave apparatus 1, there is a case of transmitting and receiving a keepalive for maintaining connection between the master apparatus and the slave apparatus 1, besides the case of individually transmitting a message from the user of the master apparatus to the user of the slave apparatus 1. Specifically, the master apparatus generates the data D22 addressed to the slave apparatus 1 (S47). In this case, the game application of the master apparatus designates the IP address of the slave apparatus 1.

The information processing section 11 of the master apparatus, with reference to the ARP table, specifies the MAC address of the slave apparatus 1 corresponding to the IP address designated by the game application, and instructs the wireless communication section 15 to transmit the data D22 with the specified MAC address of the slave apparatus 1 being designated. Then, the wireless communication section 15 of the master apparatus generates a data frame including the data D22 (S48).

Next, the wireless communication section 15 of the master apparatus transmits, to the slave apparatus 1, the frame including the data D22 addressed to the slave apparatus 1 (S49). Specifically, the wireless communication section 15 of the master apparatus wirelessly transmits the data frame, with the MAC address of the master apparatus being designated as a source address, the MAC address of the slave apparatus 1 being designated as a destination address, the MAC address of the slave apparatus 1 being designated as a receiver, and the MAC address of the master apparatus being designated as a transmitter.

Upon receiving the frame from the master apparatus, the slave apparatus 1 determines, from the destination address, that the data is addressed to the slave apparatus 1, and extracts the data D22 included in the frame. Then, the master apparatus executes the game application on the basis of the data D22.

FIG. 9 is a diagram illustrating a flow of processing in the case where the slave apparatus 1 transmits data D3 by broadcast to other apparatuses.

As shown in FIG. 9, the slave apparatus 1 generates data D3 (S50). For example, positional information of characters corresponding to the respective information processing apparatuses need to be shared among all the apparatuses. For example, when a character corresponding to a certain apparatus performs a predetermined action, this action needs to be shared among all the apparatuses. Such data can be transmitted more efficiently by broadcast than by individual transmission to each apparatus. For example, the slave apparatus 1 calculates the position of the character corresponding to the slave apparatus 1 in accordance with an input performed to the input section 13 thereof, and generates data D3 according to the calculated position. Then, the slave apparatus 1 transmits a data frame including the data D3 by broadcast (S51).

The frame transmitted by broadcast is received by the master apparatus and the slave apparatus 2. The master apparatus and the slave apparatus 2 execute the game application on the basis of the data D3 included in the received frame. Thereby, for example, the position of the character corresponding to the slave apparatus 1 is shared among the master apparatus, the slave apparatus 1, and the slave apparatus 2. In addition, for example, when the character corresponding to the slave apparatus 1 has performed a predetermined action (e.g., using an item) and data according to the predetermined action has been broadcast, the predetermined action performed by the character corresponding to the slave apparatus 1 is also reflected in the master apparatus and the slave apparatus 2.

When the slave apparatus 1 transmits data by broadcast, the slave apparatus 1 may broadcast the data via the master apparatus. In this case, the slave apparatus 1 transmits a frame, with a broadcast address being designated as a destination address, and the MAC address of the master apparatus being designated as a receiver. When transmitting data to other apparatuses, the slave apparatus may select whether to broadcast the data via the master apparatus or directly.

Next, the structure of the action frame according to the present embodiment will be described. First, the structure of a common frame in a wireless LAN will be described with reference to FIG. 10.

Figure 10:
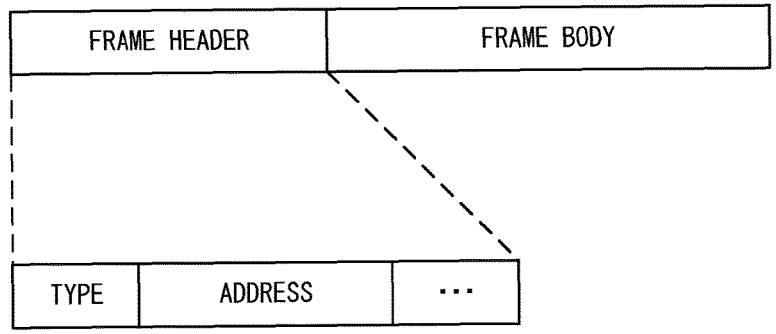
FIG. 10 is an example non-limiting diagram illustrating a structure of a general frame.

FIG. 10 is a diagram illustrating the structure of a common frame. As shown in FIG. 10, the common frame includes a frame header, and a frame body. The frame header includes a frame type and an address.

The frame type is roughly classified into a management frame, a control frame, and a data frame. The management frame is further classified into a beacon, a probe request, a probe response, an authentication, an association request, an association response, an action frame, etc.

As described above, the information processing apparatus 10 according to the present embodiment, when serving as a master apparatus, transmits an action frame at predetermined time intervals. Besides the action frame, the master apparatus also transmits the beacon described above at predetermined time intervals.

A plurality of addresses are stored in the "address". The "address" is used for setting a receiver, a transmitter, a destination address, a source address, etc., and for designating the MAC address of a master apparatus or a slave apparatus.

Figure 11:
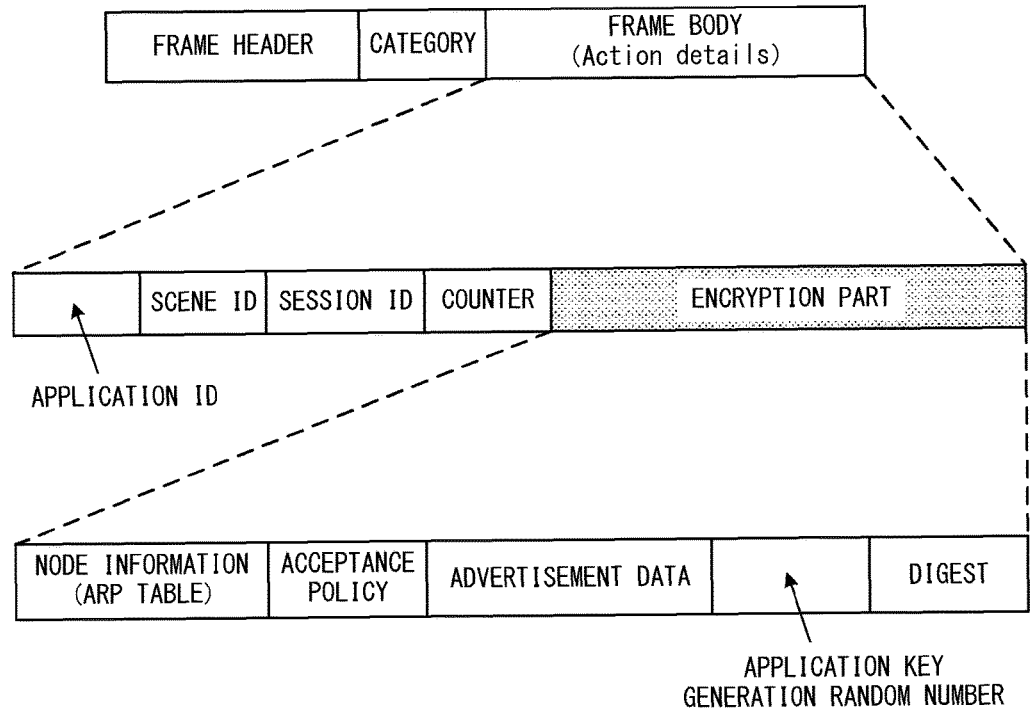
FIG. 11 is an example non-limiting diagram illustrating a structure of an action frame transmitted by the master apparatus of the present embodiment.

FIG. 11 is a diagram illustrating the structure of an action frame transmitted by the master apparatus according to the present embodiment.

The action frame is defined by IEEE802.11, and only a part thereof peculiar to the present embodiment will be described with reference to FIG. 11. As shown in FIG. 11, the action frame includes a frame header, a category, and a frame body (action details). A value indicating "vendor specific" is stored in the "category". A value indicating "action frame" is stored in "frame type" in the frame header.

The frame body in the action frame of the present embodiment includes "application ID", "scene ID", "session ID", and "counter". These are transmitted in plain texts without being encrypted.

The application ID is an ID unique to a communication application. The application ID varies among different types of communication applications to be executed, and is assigned in advance by an application manufacturer. Even different types of applications may be assigned the same application ID as long as these applications are in the same series and can be executed by performing mutual communication therebetween. The application ID is used for generating a frame encryption key. The "frame encryption key" is a key used for encryption and decryption of an encryption part shown in FIG. 11. A method for generating the frame encryption key will be described later.

The scene ID is an ID for identifying different scenes in the same application, and is assigned in advance by the application manufacturer. For example, when there are a fighting scene and an item exchange scene in the same application, these scenes are assigned different scene IDs. The scene ID is used for generating a frame encryption key.

The session ID is identification information which is used for performing communication with another information processing apparatus and is unique to the communication. The session ID is randomly generated when communication with another information processing apparatus is started. Specifically, the session ID is generated when a master apparatus is set. The session ID is used for generating a frame encryption key.

The counter is used for generating different cipher texts even when the content of the plain text in the encryption part shown in FIG. 11 is the same. The counter is randomly generated at an initial stage. When the content of the encryption part in the last action frame and the content of the encryption part in the current action frame are completely the same, the counters in these frames have the same value. On the other hand, when the content of the encryption part in the last action frame and the content of the encryption part in the current action frame are at least partially different from each other, the counter is incremented by "1". The counter is used as an IV (Initialization Vector) when the action frame is encrypted.

As shown in FIG. 11, the frame body of the action frame includes the "encryption part". The "encryption part" is encrypted on the basis of an apparatus common key (key common to the plurality of information processing apparatuses 10) stored in the key storage section 16. Specifically, the encryption part is encrypted by using the frame encryption key and the counter as the IV. The frame encryption key is generated by encrypting, using the apparatus common key, values obtained by converting the application ID, the scene ID, and the session ID in a predetermined procedure.

As shown in FIG. 11, the "encryption part" includes "node information", "acceptance policy", "advertisement data", "application key generation random number", and "digest".

The node information is information in which the IP addresses of the respective apparatuses are associated with the MAC addresses thereof, and corresponds to the ARP table described above. The node information includes information of one or a plurality of nodes (the master apparatus and the plurality of slave apparatuses) currently participating in the network. The node information includes information of 8 nodes at maximum, for example.

The acceptance policy is information indicating whether or not the master apparatus is accepting participation of slave apparatuses, and whether or not the master apparatus is conditionally accepting participation of slave apparatuses. The acceptance policy will be described later in detail.

The advertisement data is optional data regarding an application that the master apparatus transmits to slave apparatuses. While executing a communication application with another information processing apparatus 10, the master apparatus is allowed to broadcast optional data regarding the communication application, as the advertisement data to the surrounding apparatuses.

The application key generation random number is a random number used for generating an application key when a communication application is started. Application data to be transmitted/received during execution of a communication application is encrypted or decrypted by using the application key. The application key is generated in each information processing apparatus 10 on the basis of the application key generation random number, and a pass phrase unique to the application. The pass phrase unique to the application is set by the developer of the application, and is included in the application program. An application key is generated every time a communication application is started among the plurality of information processing apparatuses 10. For example, in the case where a first communication application is executed among the master apparatus, the slave apparatus 1, and the slave apparatus 2 at a certain timing, when the master apparatus is set in order to execute the first communication application, an application key is generated on the basis of the application key generation random number and the pass phrase unique to the first communication application. This application key is shared among the master apparatus, the slave apparatus 1, and the slave apparatus 2 during execution of the first communication application. In the case where the first communication application started at the certain timing is ended and the same first communication application is started at another timing, an application key generation random number is newly generated, and a new application key is generated. In the case where the first communication application is executed among the master apparatus, the slave apparatus 1, and the slave apparatus 2 at a certain timing and, at the same time, a second communication application is executed between the master apparatus and a slave apparatus 3, an application key for the first communication application and an application key for the second communication application are respectively generated.

The "digest" is a message digest (signature) of the entire frame body before being encrypted. Specifically, the digest is a hash value of a portion from the "application ID" to the "application key generation random number" shown in FIG. 11, which is calculated by using a predetermined hash function.

Next, the acceptance policy will be described in detail. The master apparatus operates in any one of a plurality of operation modes. FIG. 12A is a diagram illustrating examples of operation modes of the master apparatus.

As shown in FIG. 12A, there are "permission", "rejection", "white list", and "black list" as operation modes of the master apparatus. The operation of the master apparatus varies depending on these operation modes. The operation modes of the master apparatus are not limited to the four modes described above, and there may be other modes.

When the master apparatus is operating in the operation mode of "permission", the master apparatus accepts participation of all the slave apparatuses. That is, when the master apparatus is operating in the operation mode of "permission", the master apparatus always accept connections from all the slave apparatuses that have transmitted participation requests. For example, in the case where the master apparatus invites participation in a communication game before start of the communication game, the master apparatus sets the operation mode to "permission". When the master apparatus is operating in the operation mode of "permission", the master apparatus sets the value of the acceptance policy in the action frame to a value (e.g., "0") indicating "permission", and transmits the action frame.

When the master apparatus is operating in the operation mode of "rejection", the master apparatus does not accept any participation of slave apparatuses. That is, when the master apparatus is operating in the operation mode of "rejection", the master apparatus always rejects connections from all the slave apparatuses that have transmitted participation requests. For example, after members participating in a communication game have been decided and the communication game is started, the master apparatus sets the operation mode to "rejection". Even before the master apparatus starts the communication game, if the number of currently participating slave apparatuses has reached the upper limit, the master apparatus sets the operation mode to "rejection". When the master apparatus is operating in the operation mode of "rejection", the master apparatus sets the value of the acceptance policy in the action frame to a value (e.g., "1") indicating "rejection", and transmits the action frame.

When the master apparatus is operating in the operation mode of "white list", the master apparatus does not accept participation of slave apparatuses as in the operation mode of "rejection", but accepts reconnection of a slave apparatus that has previously been connected to the master apparatus and suddenly disconnected. For example, in the state where the master apparatus and the slave apparatus 2 are connected to each other, if a period during which the master apparatus cannot detect presence of the slave apparatus 2 due to the communication status or the like exceeds a predetermined threshold, the master apparatus and the slave apparatus 2 are disconnected from each other. In such a case, the master apparatus sets the operation mode of "white list" in order to accept reconnection of the slave apparatus 2. The master apparatus stores, in the storage unit thereof, the "white list" in which slave apparatuses, reconnections of which are to be accepted, are listed. In the case where the operation mode of "white list" is set, if there is a reconnection request (participation request) from a slave apparatus listed in the white list stored in the master apparatus, the master apparatus permits reconnection of the slave apparatus. In the case where the operation mode of "white list" is set, if there is a participation request from a slave apparatus that is not listed in the white list, the master apparatus rejects connection of the slave apparatus. When the master apparatus is operating in the operation mode of "white list", the master apparatus sets the value of the acceptance policy in the action frame to a value (e.g., "2") indicating the "white list", and transmits the action frame.

When the master apparatus is operating in the operation mode of "black list", the master apparatus accepts participation of slave apparatuses as in the operation mode of "permission", but rejects connection of a slave apparatus that has previously been connected to the master apparatus and intentionally disconnected. For example, in the state where the master apparatus and the slave apparatus 2 are connected with each other, if the master apparatus transmits, to the slave apparatus 2, a disconnection request indicating that the master apparatus intentionally disconnects the slave apparatus 2 (e.g., if the user of the master apparatus indicates his/her intention to reject participation of the user of the slave apparatus 2 in the communication application), the master apparatus and the slave apparatus 2 are disconnected from each other. In such a case, the master apparatus sets the operation mode of "black list" in order to reject reconnection of the slave apparatus 2. The master apparatus stores, in the storage unit thereof, the "black list" in which slave apparatuses, reconnections of which are to be rejected, are listed. In the case where the operation mode of "black list" is set, if there is a participation request for reconnection from a slave apparatus listed in the black list stored in the master apparatus, the master apparatus rejects reconnection of this slave apparatus. In the case where the operation mode of "black list" is set, if there is a participation request from a slave apparatus not listed in the black list, the master apparatus permits connection of this slave apparatus. When the master apparatus is operating in the operation mode of "black list", the master apparatus sets the value of the acceptance policy in the action frame to a value (e.g., "3") indicating "black list", and transmits the action frame.

The master apparatus transmits a disconnection request to a slave apparatus not only when the user of the master apparatus intentionally rejects other users but also in other cases. The disconnection request transmitted by the master apparatus includes the reason for disconnection. The master apparatus determines whether or not to include the slave apparatus into the black list, depending on the reason for disconnection when the master apparatus transmits the disconnection request to the slave apparatus.

For example, in the case where the user of the master apparatus rejects the user of the slave apparatus as described above (in the case where the user of the slave apparatus is intentionally excluded from the communication game), the master apparatus transmits, to the slave apparatus, a disconnection request including the reason for disconnection, and includes the slave apparatus into the black list. The disconnection request that is transmitted when the user of the master apparatus intentionally rejects the user of the slave apparatus is also referred to as "first disconnection request".

When the master apparatus shifts to a sleep mode due to an operation by the user or the master apparatus shifts to a sleep mode because a non-input state continues for a predetermined period regardless of an operation by the user, or when the master apparatus shifts to a flight mode (an operation mode in which a wireless communication function is OFF) due to an operation by the user, the master apparatus transmits, to a slave apparatus, a disconnection request including the reason for disconnection. In this case, the master apparatus does not include the slave apparatus into the black list. Such a disconnection request is also referred to as "second disconnection request".

When the master apparatus has shifted to the sleep mode or the flight mode, there is no master apparatus in the network. In this case, a slave apparatus in the network becomes a master apparatus to maintain connection, whereby execution of the communication application can be continued. In this case, the new master apparatus inherits the session ID.

Meanwhile, upon receiving an action frame, a slave apparatus operates according to the value of the acceptance policy in the action frame. FIG. 12B is a diagram showing an example of an operation of a slave apparatus that has received an action frame.

As shown in FIG. 12B, a slave apparatus that has received an action frame in which the acceptance policy is "permission" knows that the master apparatus that has transmitted this action frame is operating in the operation mode of "permission". Therefore, the slave apparatus that has received the action frame displays information of the master apparatus that has transmitted the action frame, as a connection destination candidate.

Meanwhile, a slave apparatus that has received an action frame in which the acceptance policy is "rejection" knows that the master apparatus that has transmitted this action frame is operating in the operation mode of "rejection". Therefore, the slave apparatus that has received the action frame does not display information of the master apparatus that has transmitted the action frame, as a connection destination candidate.

A slave apparatus that has received an action frame in which the acceptance policy is "white list" knows that the master apparatus is operating in the operation mode of "white list", and that the master apparatus permits reconnection of only slave apparatuses that have previously been connected to the master apparatus. Therefore, if the slave apparatus has previously been connected to the master apparatus, the slave apparatus displays information of the master apparatus that has transmitted this action frame, as a connection destination candidate. The slave apparatus may display, on the display section 14, a screen indicating that reconnection to the master apparatus is allowed. Alternatively, the slave apparatus may automatically transmit a participation request to the master apparatus that has transmitted the action frame.

A slave apparatus that has received an action frame in which the acceptance policy is "black list" knows that the master apparatus is operating in the operation mode of "black list" and that the master apparatus rejects reconnection of slave apparatuses that have been connected to the master apparatus but intentionally disconnected. Therefore, if the slave apparatus has previously received a first disconnection request from the master apparatus, the slave apparatus does not display information of the master apparatus that has transmitted the action frame, as a connection destination candidate. Alternatively, the slave apparatus does not automatically transmit a reconnection request to the master apparatus that has transmitted the action frame. The slave apparatus may display, on the display section 14, a screen indicating that reconnection to the master apparatus is not allowed.

In the present embodiment, when transmitting an action frame, the master apparatus sets any value of 0 to 3 as the "acceptance policy" in the action frame, but does not include, in the action frame, the "white list" itself which is stored therein and lists the apparatuses, reconnections of which are to be accepted, and the "black list" itself which is stored therein and lists the apparatuses, reconnections of which are to be rejected.

In another embodiment, when transmitting an action frame, the master apparatus may include, in the action frame, the "white list" itself which is stored therein, and the "black list" itself which is stored therein.

The slave apparatus determines whether or not to display the master apparatus as a connection destination candidate, that is, whether or not to transmit a participation request for reconnection to the master apparatus, on the basis of the value stored in the "acceptance policy" in the action frame received from the master apparatus, and the disconnection request previously received from the master apparatus.

The slave apparatus determines whether or not to reconnect to the master apparatus (whether or not to display the master apparatus as a connection destination candidate) also on the basis of the "session ID" in the action frame, in addition to the value of the "acceptance policy" in the action frame and the disconnection request previously received from the master apparatus. When connection with the master apparatus is established, the slave apparatus stores the session ID therein. This session ID is stored in the slave apparatus for a predetermined period even when the slave apparatus is disconnected from the master apparatus. For example, when communication with the master apparatus is not performed for a predetermined period, the slave apparatus disconnects from the master apparatus, and stores therein the session ID of the connection, for reconnection with the master apparatus. In the case where the slave apparatus receives an action frame after having been disconnected from the master apparatus, if the session ID included in the action frame matches the session ID used for the connection with the master apparatus before the disconnection, the slave apparatus knows that the slave apparatus has been connected to the master apparatus just before the disconnection. In this case, for example, the slave apparatus displays, on the display section 14, a screen that allows the user to select whether or not to reconnect the slave apparatus to the master apparatus. When reconnection is selected by the user, the slave apparatus transmits a participation request for reconnection to the master apparatus that has transmitted the action frame.

On the other hand, in the case where the slave apparatus receives an action frame after having been disconnected from the master apparatus, if the session ID included in the action frame does not match the session ID used for the connection with the master apparatus before the disconnection, the slave apparatus determines that the master apparatus that has transmitted the action frame is different from the master apparatus to which the slave apparatus has been connected just before the disconnection. In this case, for example, the slave apparatus displays, on the display section 14, a screen that allows the user to select whether or not to newly connect the slave apparatus to the master apparatus. When the user selects to newly connect the slave apparatus to the master apparatus, the slave apparatus transmits a participation request for new connection to the master apparatus that has transmitted the action frame. For example, in the case where the slave apparatus has received a first disconnection request transmitted from a master apparatus A to which the slave apparatus was just connected, if the slave apparatus receives an action frame from another master apparatus B, the slave apparatus transmits a participation request to the master apparatus B even if the value of the acceptance policy in this action frame indicates "black list". When receiving an action frame, the slave apparatus can determine, on the basis of the session ID and/or the MAC address, whether the action frame is from the master apparatus A that has transmitted the first disconnection request or from the master apparatus B different from the master apparatus A.

(Details of Processing Performed in Respective Apparatuses)

Next, processing performed in an information processing apparatus 10 will be described in detail. FIG. 13 is a flowchart illustrating, in detail, processing for setting an information processing apparatus 10 as a master apparatus or a slave apparatus. When each of a plurality of information processing apparatuses 10 is subjected to the processing shown in FIG. 13, each information processing apparatus 10 is set as a master apparatus or a slave apparatus. The processing shown in FIG. 13 is performed by the information processing section 11 (specifically, a CPU) of the information processing apparatus 10 performing a predetermined program.

As shown in FIG. 13, first, the information processing apparatus 10 displays, on the display section 14, a selection screen that allows a user to select whether or not to set the information processing apparatus 10 as a master apparatus (step S101).

When it is selected, through the selection screen, to set the information processing apparatus 10 as a master apparatus (step S102: YES), the information processing apparatus 10 sets itself as a master apparatus (step S103). On the other hand, when it is selected, through the selection screen, not to set the information processing apparatus 10 as a master apparatus (step S102: NO), the information processing apparatus 10 sets itself as a slave apparatus (step S104). When the process in step S103 has been executed, the information processing apparatus 10 thereafter operates as a master apparatus, and executes master apparatus processing shown in FIG. 15. When the process in step S104 has been executed, the information processing apparatus 10 thereafter operates as a slave apparatus, and executes slave apparatus processing shown in FIG. 20.

Next, the operation of the master apparatus will be described with reference to FIGS. 15 to 18.

(Data Stored in Master Apparatus)

Figure 14:
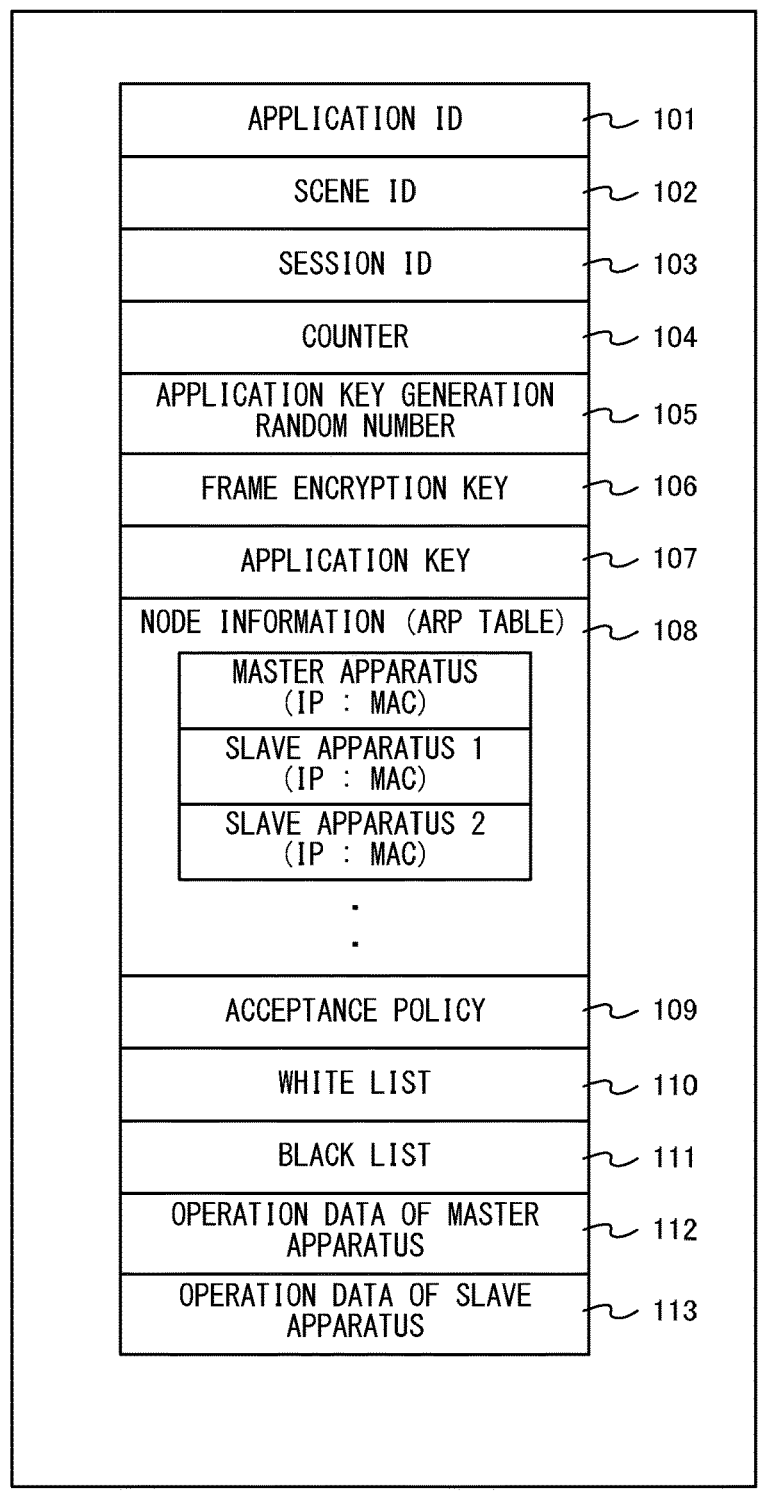
FIG. 14 is an example non-limiting diagram illustrating an example of data stored in the master apparatus.

First, data stored in the master apparatus will be described with reference to FIG. 14. FIG. 14 is a diagram illustrating examples of data stored in the master apparatus.

As shown in FIG. 14, storage regions 101 to 113 are provided in the master apparatus. Specifically, an application ID, a scene ID, a session ID, a counter, and an application key generation random number as described above are stored in the storage regions 101 to 105, respectively. A frame encryption key and an application key are stored in the storage regions 106 and 107, respectively.

Node information (ARP table) is stored in the storage region 108. The node information (ARP table) includes: data in which the IP address and the MAC address of the master apparatus are associated with each other; and data in which the IP address and the MAC address of each of slave apparatuses connected to the master apparatus are associated with each other.

A value representing an acceptance policy (operation mode) is stored in the storage region 109. A white list is stored in the storage region 110. The white list includes information of slave apparatuses (IP address, MAC address, etc.). A black list is stored in the storage region 111. The black list includes information of slave apparatuses (IP address, MAC address, etc.).

Operation data according to an input performed to the input section 13 of the master apparatus is stored in the storage region 112. Operation data received from each slave apparatus (operation data according to an input performed to the input section 13 of each slave apparatus) is stored in the storage region 113.

The various types of data shown in FIG. 14 are stored in a storage unit of the master apparatus (any one of the DRAM in the information processing section 11, the storage section 12, and the memory in the wireless communication section 15), and are readable from the information processing section 11 of the master apparatus.

(Master Apparatus Processing)

Figure 15:
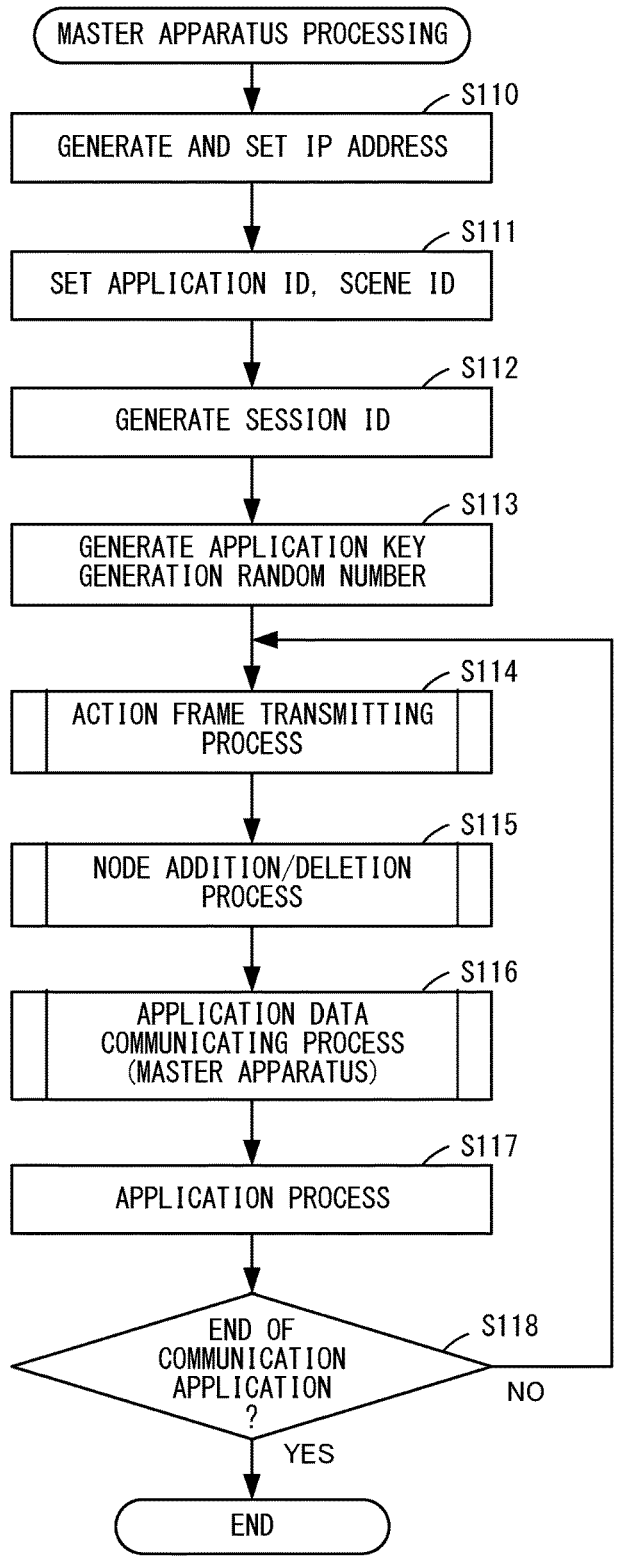
FIG. 15 is an example non-limiting flowchart illustrating details of master apparatus processing when the information processing apparatus 10a is operating as a master apparatus.

FIG. 15 is a flowchart illustrating, in detail, master apparatus processing when the information processing apparatus 10a is operating as a master apparatus.

As shown in FIG. 15, first, the information processing apparatus 10a (master apparatus) generates an IP address thereof, and sets the generated IP address therein (step S110). Subsequently, the master apparatus sets an application ID and a scene ID in the storage region 101 and the storage region 102, respectively (step S111). As described above, the application ID and the scene ID are predetermined IDs, and the master apparatus sets the application ID and the scene ID in accordance with the type of a communication application to be executed and a scene in the application, respectively.

Subsequently, the master apparatus randomly generates a session ID, and stores the session ID in the storage region 103 (step S112). Next, the master apparatus randomly generates an application key generation random number, and stores the random number in the storage region 105 (step S113). In addition, in step S113, the master apparatus generates an application key by using the generated application key generation random number, and a pass phrase, unique to the application, stored in an application program, and stores the application key in the storage region 107. The master apparatus, by using the application key, performs encryption and decryption of application data transmitted/received during execution of the communication application. Also in each slave apparatus, the same application key is generated by using the application key generation random number transmitted from the master apparatus.

When an information processing apparatus 10a becomes a master apparatus to execute the communication application with a plurality of information processing apparatuses 10, the information processing apparatus 10a executes the processes in steps S110 to S113 only once. After executing the process in step S113, the master apparatus repeatedly executes the processes in steps S114 to S118.

Specifically, the master apparatus executes an action frame transmitting process (step S114). The action frame transmitting process is a process for transmitting the action frame described above, and is repeatedly executed at predetermined time intervals (e.g., every 100 msec). The action frame transmitting process will be described later in detail.

Next, the master apparatus executes a node addition/deletion process (step S115). The node addition/deletion process is a process for causing a slave apparatus to participate in or withdraw from a communication application. The node addition/deletion process will be described later in detail.

Subsequently to step S115, the master apparatus executes an application data communicating process (master apparatus) (step S116). When the master apparatus stops accepting participation of slave apparatuses (e.g., when the number of participating slave apparatuses has reached the upper limit in the process of step S115, or when an instruction is made by the user of the master apparatus), the master apparatus starts execution of the communication application. The application data communicating process (master apparatus) is a process for transmitting application data during execution of the communication application between the master apparatus and the slave apparatus. The application data communicating process (master apparatus) in step S116 will be described later in detail.

Subsequently to step S116, the master apparatus executes an application process (step S117). Specifically, the master apparatus executes the application process on the basis of the data received in step S116. For example, the master apparatus receives, in step S116, operation data according to an input performed to the input section 13 of a slave apparatus, and stores the received operation data in the storage region 113. The master apparatus executes the application process on the basis of the operation data, of the slave apparatus, stored in the storage region 113. In addition, the master apparatus stores, in the storage region 112, operation data according to an input performed to the input section 13 thereof. The master apparatus executes the application process on the basis of the operation data, of the master apparatus, stored in the storage region 112. For example, when a fighting game is performed as the communication application among a plurality of users, operation data according to an input performed by each user is received in step S116. On the basis of the operation data, the master apparatus causes a character corresponding to each user to act or move in a game space. Then, the master apparatus causes the display section 14 to display an image according to the application process.

When the process in step S117 has been executed, the master apparatus determines whether or not to end the communication application (step S118). For example, when an instruction to end the communication application is made by the user of the master apparatus or when a predetermined period has elapsed from the start of the communication application, the master apparatus determines to end the communication application. Upon determining not to end the communication application (step S118: NO), the master apparatus again executes the process in step S114.

(Action Frame Transmitting Process)

Figure 16:
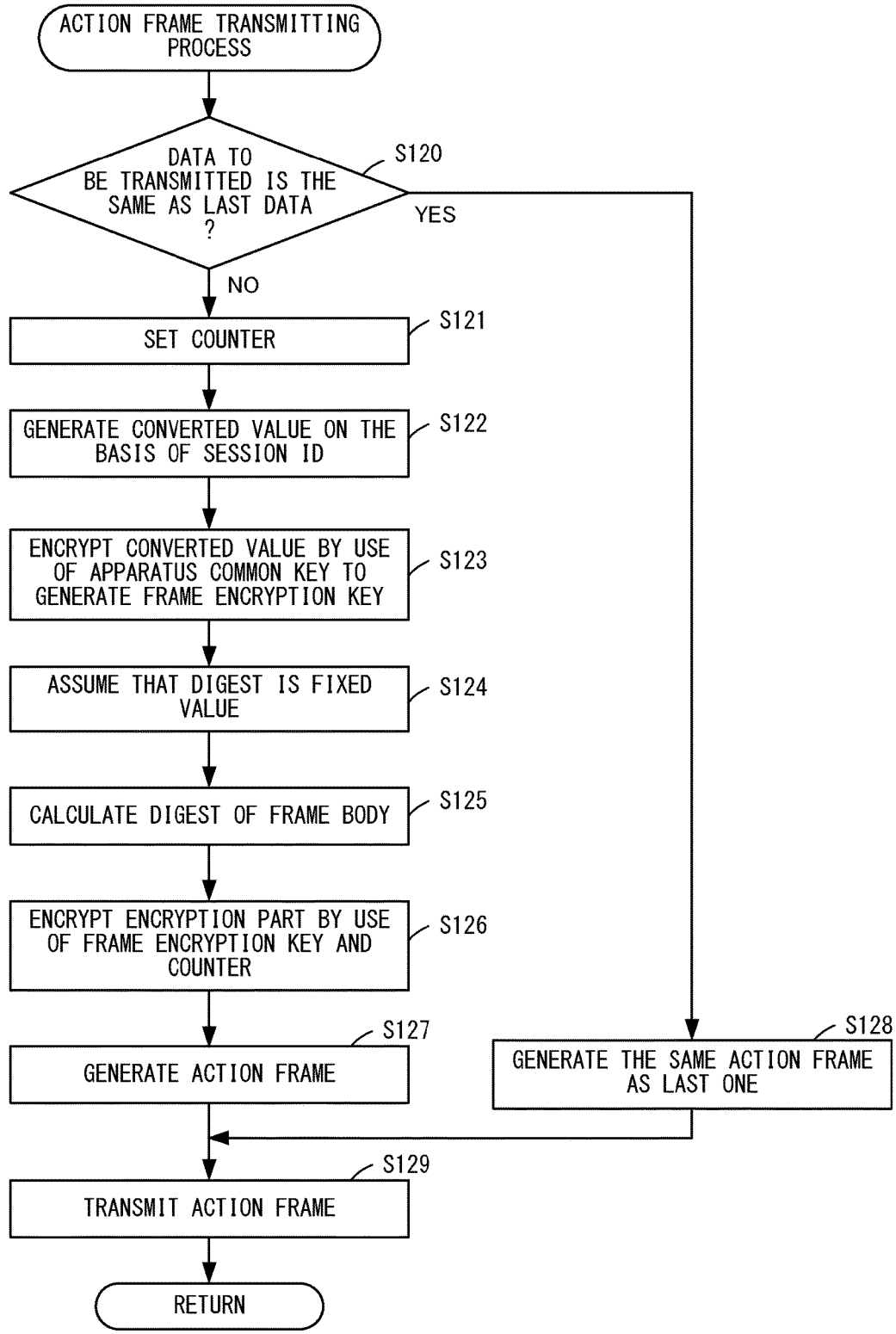
FIG. 16 is an example non-limiting flowchart illustrating details of an action frame transmitting process at step S114 in FIG. 15.

Next, the action frame transmitting process will be described in detail. FIG. 16 is a flowchart illustrating, in detail, the action frame transmitting process in step S114 shown in FIG. 15.

As shown in FIG. 16, the master apparatus determines whether or not the data to be transmitted is the same as the data in the action frame transmitted last time (step S120). Specifically, when the node information is not changed, the acceptance policy (operation mode) is not changed, and the advertisement data is not changed, the master apparatus determines as YES in step S120. On the other hand, when any of these data is changed, the master apparatus determines as NO in step S120. When the master apparatus firstly executes the process in step S120, the master apparatus always determines as NO.

Upon determining that the data to be transmitted is different from the last data (step S120: NO), the master apparatus generates a counter and sets the counter in the storage region 104 (step S121). Specifically, when the master apparatus firstly executes the process in step S121, the master apparatus randomly generates the counter. On the other hand, when executing the process in step S121 on and after the second time, the master apparatus adds "1" to the value of the counter stored in the storage region 104, and stores the value of the counter after the addition, in the storage region 104.

Next, the master apparatus generates converted values on the basis of the session ID set in the storage region 103 (step S122). Specifically, the master apparatus converts the application ID and the scene ID set in step S111 and the session ID generated in step S112 by using a predetermined function, thereby generating converted values.

Next, the master apparatus encrypts the converted values generated in step S122 by using the apparatus common key, thereby generating a frame encryption key (step S123). The master apparatus stores the generated frame encryption key in the storage region 106. Subsequently to step S123, the master apparatus assumes that the value of "digest" is a fixed value (step S124).

Next, the master apparatus calculates a message digest of the frame body shown in FIG. 11 in the case where the value of the "digest" is the fixed value (step S125). Specifically, the master apparatus arranges the frame body (action details) shown in FIG. 11 (specifically, the application ID, the scene ID, the session ID, the counter, the node information, the acceptance policy, the advertisement data, the application key generation random number, and the digest assumed to be a fixed value) in order as shown in FIG. 11, and a hash value of the data in this portion is calculated by using a predetermined hash function, thereby calculating the "digest".

The "node information" and the "acceptance policy" are generated and changed when the node addition/deletion process described later is performed. The "advertisement data" is set at an appropriate time in response to, for example, a request from the communication application. For example, when the communication application broadcasts predetermined data used for the application process to the surroundings by using the action frame, the communication application sets the advertisement data.

Next, the master apparatus encrypts the encryption part (the node information, the acceptance policy, the advertisement data, the application key generation random number, and the digest) of the frame body shown in FIG. 11 by using the frame encryption key generated in step S123 and the counter (step S126). That is, in step S126, the master apparatus encrypts the encryption part (plain text) of the frame body by using the frame encryption key and the counter as an IV. The plain text is encrypted in different cipher texts if the counter as an IV differs even when the same frame encryption key is used. Since the counter is changed every time at least a portion of the plain text in the encryption part is changed, even if a portion of the plain text in the encryption part is the same as that in the last encryption, the same cipher text as in the last encryption is not obtained.

Then, the master apparatus generates an action frame (step S127). Specifically, the master apparatus arranges the application ID, the scene ID, the session ID, the counter, and the encryption part encrypted in step S126 in this order to generate the frame body shown in FIG. 11. Then, the master apparatus adds the frame header in front of the frame body to generate the action frame shown in FIG. 11.

Meanwhile, upon determining that the data to be transmitted is the same as the last data (step S120: YES), the master apparatus generates the same action frame as the last action frame (step S128).

When having executed the process in step S127 or the process in step S128, the master apparatus transmits the generated action frame (step S129). Thus, the action frame is broadcast.

As is seen from the above description, the "frame encryption key" is generated on the basis of the apparatus common key and the session ID. The session ID is generated when the information processing apparatus 10 is set as a master apparatus. Therefore, the frame encryption key is generated every time the master apparatus is set. The action frame is encrypted by using the frame encryption key and the counter. The apparatus common key is a key common to the respective information processing apparatuses 10 and is a fixed key, but the value of the counter is changed every time the data of the encryption part in the action frame is changed. Therefore, even when the action frame which is encrypted by using the "frame encryption key" and the counter is repeatedly transmitted, the encryption part in the action frame is changed in every transmission. Therefore, another apparatus that does not have the frame encryption key cannot easily derive the frame encryption key even when the apparatus repeatedly receives the action frame, and therefore cannot easily decrypt the encryption part in the action frame.

(Node Addition/Deletion Process)

Figure 17:
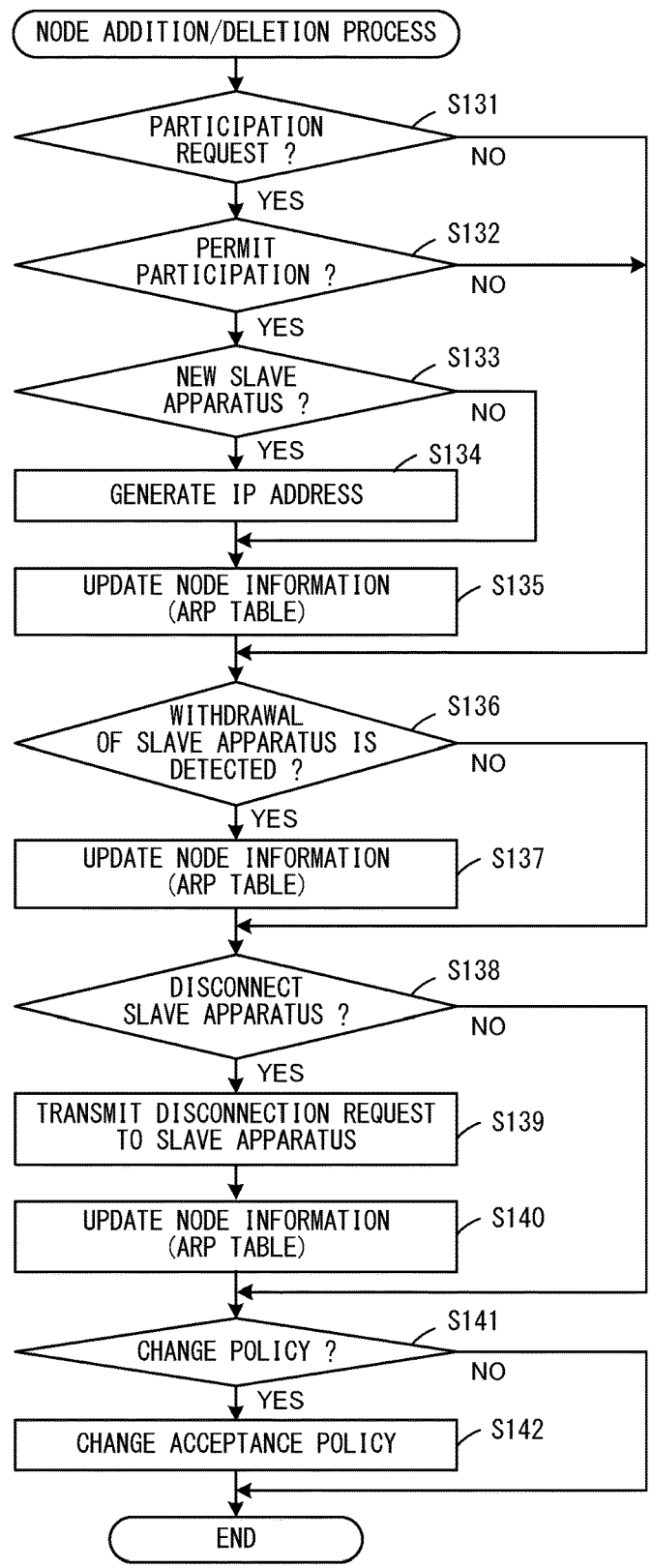
FIG. 17 is an example non-limiting flowchart illustrating details of a node addition/deletion process at step S115 in FIG. 16.

Next, the node addition/deletion process will be described in detail. FIG. 17 is a flowchart illustrating, in detail, the node addition/deletion process in step S115 shown in FIG. 16.

As shown in FIG. 17, the master apparatus determines whether or not a participation request in the communication application is received from a slave apparatus (step S131). The participation request from the slave apparatus includes the MAC address of the slave apparatus.

Upon determining that a participation request from a slave apparatus is received (step S131: YES), the master apparatus determines whether or not to permit participation of the slave apparatus that has transmitted the participation request, on the basis of the value of the operation mode (acceptance policy) set in the storage region 109 (step S132). Specifically, in the case where the value indicating the operation mode of "white list" is set in the storage region 109, the master apparatus determines whether or not the slave apparatus that has transmitted the participation request is included in the white list stored in the storage region 110, thereby determining whether or not to permit participation of the slave apparatus that has transmitted the participation request. When the slave apparatus that has transmitted the participation request is included in the white list, the master apparatus permits participation of the slave apparatus. When the slave apparatus that has transmitted the participation request is not included in the white list, the master apparatus rejects participation of the slave apparatus.

In the case where the value indicating the operation mode of "black list" is set in the storage region 109, the master apparatus determines whether or not the slave apparatus that has transmitted the participation request is included in the black list stored in the storage region 111, thereby determining whether or not to permit participation of the slave apparatus that has transmitted the participation request. When the slave apparatus that has transmitted the participation request is included in the black list, the master apparatus rejects participation of the slave apparatus. When the slave apparatus that has transmitted the participation request is not included in the black list, the master apparatus permits participation of the slave apparatus.

In the case where the value indicating the operation mode of "permission" is set in the storage region 109, the master apparatus permits participation of the slave apparatus that has transmitted the participation request, without referring to the black list or the white list. In the case where the value indicating the operation mode of "rejection" is set in the storage region 109, the master apparatus rejects participation of the slave apparatus that has transmitted the participation request, without referring to the black list or the white list.

In the case where the operation mode of "permission" is set, the master apparatus may execute the process in step S134 without executing the processes in steps S132 and S133. In the case where the operation mode of "rejection" is set, the master apparatus may execute the process in step S136 without executing the processes in steps S132 to S135.

Upon permitting participation of the slave apparatus that has transmitted the participation request (step S132: YES), the master apparatus determines whether or not the slave apparatus that has transmitted the participation request is a new slave apparatus (step S133). From when the master apparatus has set itself as a master apparatus in step S103 and started the processing shown in FIG. 15, the master apparatus stores, in the storage unit, information (including IP addresses and MAC addresses) of slave apparatuses that have participated in the communication application. For example, in the case where, after the processing shown in FIG. 15 is started, the slave apparatus 1 participates in the communication application and thereafter communication with the slave apparatus 1 is disconnected due to, for example, deteriorated communication status, the master apparatus deletes the slave apparatus 1 from the node information (ARP table), and stores information of the slave apparatus 1 in the white list. Then, upon determining that the slave apparatus that has transmitted the participation request this time is the slave apparatus 1 stored in the white list, the master apparatus determines that the slave apparatus that has transmitted the participation request is a slave apparatus that has previously been connected to the master apparatus, and determines as NO in step S133. On the other hand, upon determining that the slave apparatus that has transmitted the participation request this time is not a slave apparatus that has previously connected to the master apparatus, the master apparatus determines as YES in step S133.

Upon determining that the slave apparatus that has transmitted the participation request is a new slave apparatus (step S133: YES), the master apparatus generates an IP address of the slave apparatus that has transmitted the participation request. Specifically, the master apparatus assigns IP addresses to slave apparatuses according to the order of participation requests transmitted therefrom.

When having executed the process in step S134 or when having determined as NO in step S133, the master apparatus updates the node information (ARP table) (step S135). Specifically, when executing the process in step S135 subsequently to the process in step S134, the master apparatus associates the IP address generated in step S134 with the MAC address of the slave apparatus that has transmitted the participation request, thereby updating the node information in the storage region 108. When executing the process in step S135 subsequently to the process in step S133, the master apparatus, for example, on the basis of the information stored in the white list, assigns the same IP address as the last one to the slave apparatus that has transmitted the participation request, and associates this IP address with the MAC address of the slave apparatus, thereby updating the node information in the storage region 108.

When having executed the process in step S135, or when having determined as NO in step S132, or when having determined as NO in step S131, the master apparatus determines whether or not withdrawal of a slave apparatus is detected (step S136). For example, the master apparatus periodically receives frames from the slave apparatuses being connected thereto, and determines whether or not connection with each slave apparatus is maintained. Specifically, the master apparatus periodically transmits a frame to each slave apparatus and receives, from each slave apparatus, a response frame to the transmitted frame, thereby determining whether or not connection with each slave apparatus is maintained. Further, when a slave apparatus is instructed to withdraw from the communication application by the user of the slave apparatus, the slave apparatus transmits, to the master apparatus, a message indicating that the slave apparatus withdraws from the communication application. The master apparatus determines that withdrawal of a slave apparatus is detected (step S136: YES) when the master apparatus does not receive a response frame from the slave apparatus within a predetermined period, or receives a message indicating withdrawal from the slave apparatus.

Upon detecting withdrawal of a slave apparatus (step S136: YES), the master apparatus deletes the slave apparatus from the node information (ARP table) to update the node information (step S137). At this time, the master apparatus adds information (IP address, MAC address, user name, etc.) of the deleted slave apparatus to the white list so as to be stored in the storage region 110.

When having executed the process in step S137 or when having determined as NO in step S136, the master apparatus determines whether or not to disconnect the slave apparatus (step S138). For example, when the user of the master apparatus instructs to intentionally reject the slave apparatus, the master apparatus determines as YES in step S138. For example, when the master apparatus shifts to the sleep mode, the master apparatus determines as YES in step S138.

Upon determining to disconnect the slave apparatus (step S138: YES), the master apparatus transmits a disconnection request to the slave apparatus (step S139). For example, when the user of the master apparatus intentionally rejects the slave apparatus, the master apparatus transmits a first disconnection request to the slave apparatus.

Subsequently to step S139, the master apparatus deletes, from the node information, the slave apparatus determined to be disconnected, thereby updating the node information (step S140). When having transmitted the first disconnection request to the slave apparatus, the master apparatus adds information (IP address, MAC address, user name, etc.) of the slave apparatus to the black list so as to be stored in the storage region 111.

When having executed the process in step S140 or when having determined as NO in step S138, the master apparatus determines whether or not to change the value of the acceptance policy (operation mode) stored in the storage region 109 (step S141). Upon determining to change the value of the acceptance policy (step S141: YES), the master apparatus changes the value of the acceptance policy and stores the value in the storage region 109 (step S142). For example, when the number of the participating slave apparatuses has reached the upper-limit number due to the addition of the slave apparatus in the process of step S135, the master apparatus changes the value of the acceptance policy stored in the storage region 109 from the value indicating "permission" to the value indicating "rejection". When the master apparatus, which is inviting slave apparatuses to participate in the communication game, stops inviting slave apparatuses and starts the communication game, the master apparatus changes the value of the acceptance policy stored in the storage region 109 from the value indicating "permission" or "rejection" to the value indicating "white list", for example. When having transmitted the first disconnection request in step S139, the master apparatus changes the value of the acceptance policy stored in the storage region 109 from the value indicating "permission" or "rejection" to the value indicating "black list", for example. Thus, although the master apparatus, before transmission of the first disconnection request, has transmitted the action frame including the value indicating, for example, "permission" as the acceptance policy, the master apparatus, after transmission of the first disconnection request, transmits the action frame including the value indicating "black list" as the acceptance policy.

When having executed the process in step S142 or when having determined as NO in step S141, the master apparatus ends the processing shown in FIG. 17.

(Application Data Communicating Process (Master Apparatus))

Figure 18:
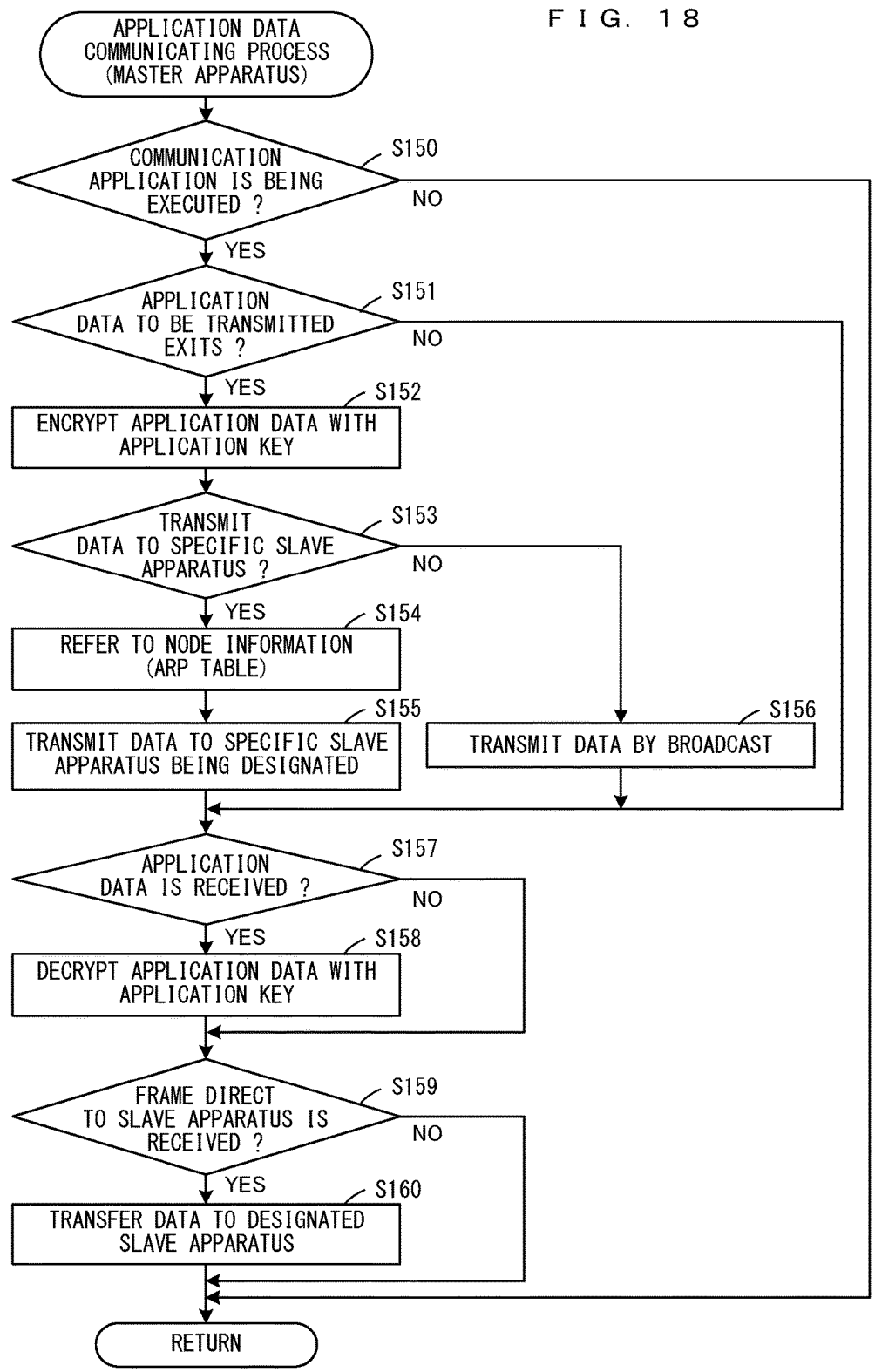
FIG. 18 is an example non-limiting flowchart illustrating details of an application data communicating process (master apparatus) at step S116 in FIG. 16.

Next, the application data communicating process performed in the master apparatus will be described in detail. FIG. 18 is a flowchart illustrating, in detail, the application data communicating process (master apparatus) in step S116 shown in FIG. 16.

As shown in FIG. 18, the master apparatus determines whether or not a communication application is being executed (step S150). For example, when acceptance of participation of slave apparatuses is ended and execution of the communication application (communication game) is started among a plurality of apparatuses, the master apparatus determines as YES in step S150. On the other hand, when the master apparatus is accepting participation of slave apparatuses, the master apparatus determines as NO in step S150, and the processing shown in FIG. 18 is ended.

When the communication application is being executed (step S150: YES), the master apparatus determines whether or not there is application data to be transmitted from the master apparatus to slave apparatus (step S151). For example, when there is a request for transmission of application data (e.g., operation data) from the application being executed in the master apparatus, the master apparatus determines that there is application data to be transmitted.

Upon determining that there is application data to be transmitted (step S151: YES), the master apparatus encrypts the application data transferred from the application, by using the application key stored in the storage region 107 (step S152). As described above, the application key is generated in step S113 on the basis of the application key generation random number and stored in the storage region 107. The application key may be generated on the basis of the application key generation random number when acceptance of participation of slave apparatuses is ended and the communication application is started.

Subsequently to step S152, the master apparatus determines whether or not to transmit the data to a specific slave apparatus (step S153). Whether the application data is to be transmitted to a specific slave apparatus by unicast or to be transmitted to all the slave apparatuses by broadcast is determined by the application. At this time, the application designates the IP address of the specific slave apparatus to which the data is transmitted.

Upon determining to transmit the data to the specific slave apparatus (step S153: YES), the master apparatus refers to the node information (ARP table) stored in the storage region 108 (step S154). Then, the master apparatus generates a data frame in which the MAC address corresponding to the IP address designated by the application is designated, and transmits the data encrypted in step S152 to the specific slave apparatus by unicast (step S155).

On the other hand, when having determined as NO in step S153, the master apparatus transmits the data encrypted in step S152 by broadcast (step S156). Specifically, the master apparatus generates a data frame in which a broadcast address is designated as a destination address, and transmits the data encrypted in step S152 by broadcast.

When having executed the process in step S155, or when having executed the process in step S156, or when having determined as NO in step S151, the master apparatus determines whether or not application data from a slave apparatus is received (step S157). Upon determining that application data is received (step S157: YES), the master apparatus decrypts the received data by using the application key stored in the storage region 107 (step S158).

When having executed the process in step S158 or when having determined as NO in step S157, the master apparatus determines whether or not a data frame directed from a certain slave apparatus to another slave apparatus is received (step S159). Upon determining that a data frame from a certain slave apparatus to another slave apparatus is received (step S159: YES), the master apparatus transfers the received frame to the slave apparatus designated by a destination address (step S160).

Next, the operation of a slave apparatus will be described with reference to FIGS. 20 to 23.

(Data Stored in Slave Apparatus)

Figure 19:
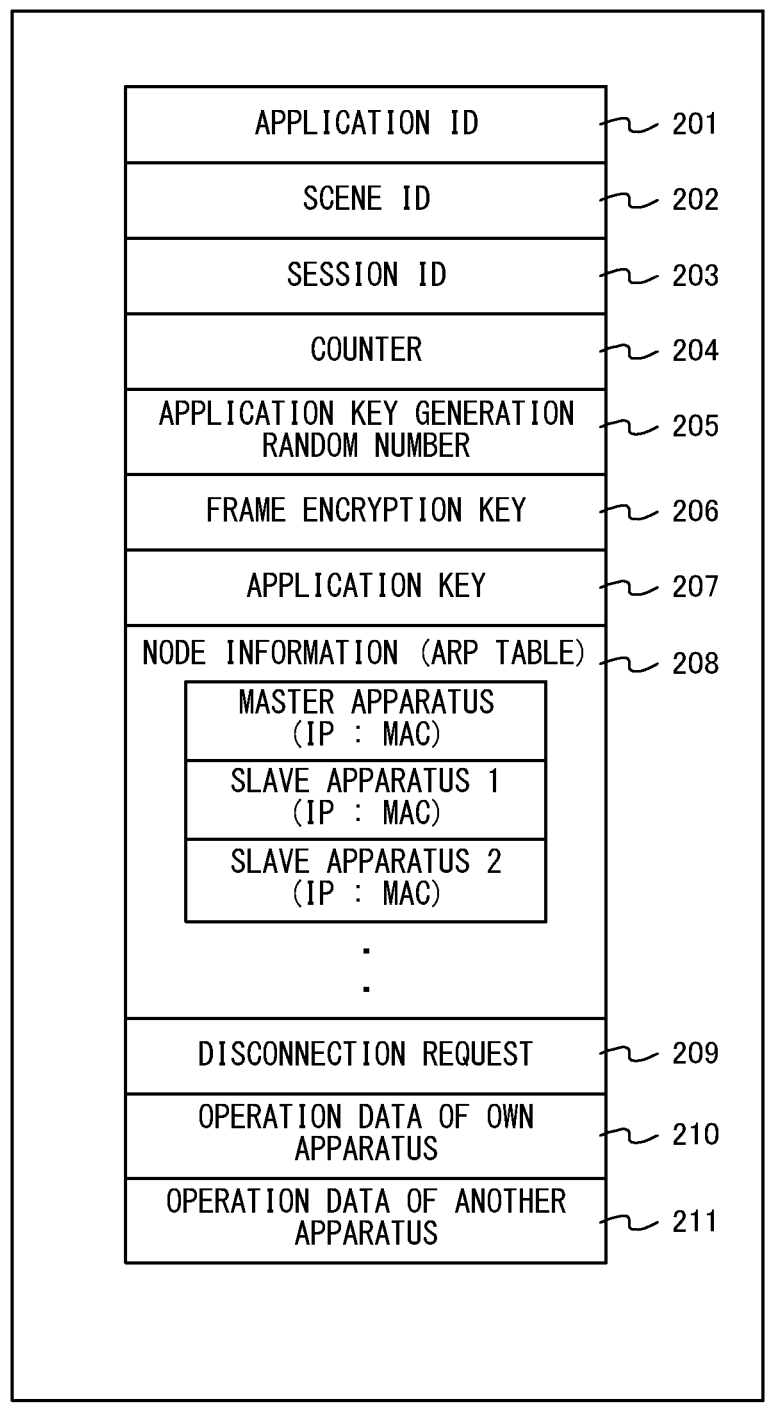
FIG. 19 is an example non-limiting diagram illustrating an example of data stored in a slave apparatus.

First, data stored in a slave apparatus will be described with reference to FIG. 19. FIG. 19 is a diagram illustrating examples of data stored in the slave apparatus.

As shown in FIG. 19, storage regions 201 to 211 are provided in the slave apparatus. Specifically, an application ID, a scene ID, a session ID, a counter, and an application key generation random number, which are included in an action frame received from the master apparatus, are stored in the storage regions 201 to 205, respectively. A frame encryption key and an application key are stored in the storage region 206 and the storage region 207, respectively.

Node information (ARP table) included in the action frame received from the master apparatus is stored in the storage region 208. The node information (ARP table) includes: data in which the IP address and the MAC address of the master apparatus are associated with each other; and data in which the IP address and the MAC address of each of slave apparatuses participating in the communication application are associated with each other.

A disconnection request received from the master apparatus is stored in the storage region 209. For example, if the master apparatus transmits a disconnection request to the slave apparatus 1 in step S139, the slave apparatus 1 stores this disconnection request in the storage region 209. Information (e.g., MAC address, IP address, etc.) of the master apparatus that has transmitted the disconnection request is also stored in the storage region 209.

Operation data according to an input performed to the input section 13 of the slave apparatus is stored in the storage region 210. Operation data according to inputs performed to the input sections 13 of other apparatuses (master apparatus and another slave apparatus) are stored in the storage region 211.

The various types of data shown in FIG. 19 are stored in a storage unit (any one of the DRAM in the information processing section 11, the storage section 12, and the memory in the wireless communication section 15) of the slave apparatus, and are readable from the information processing section 11 of the slave apparatus.

(Slave Apparatus Processing)

Figure 20:
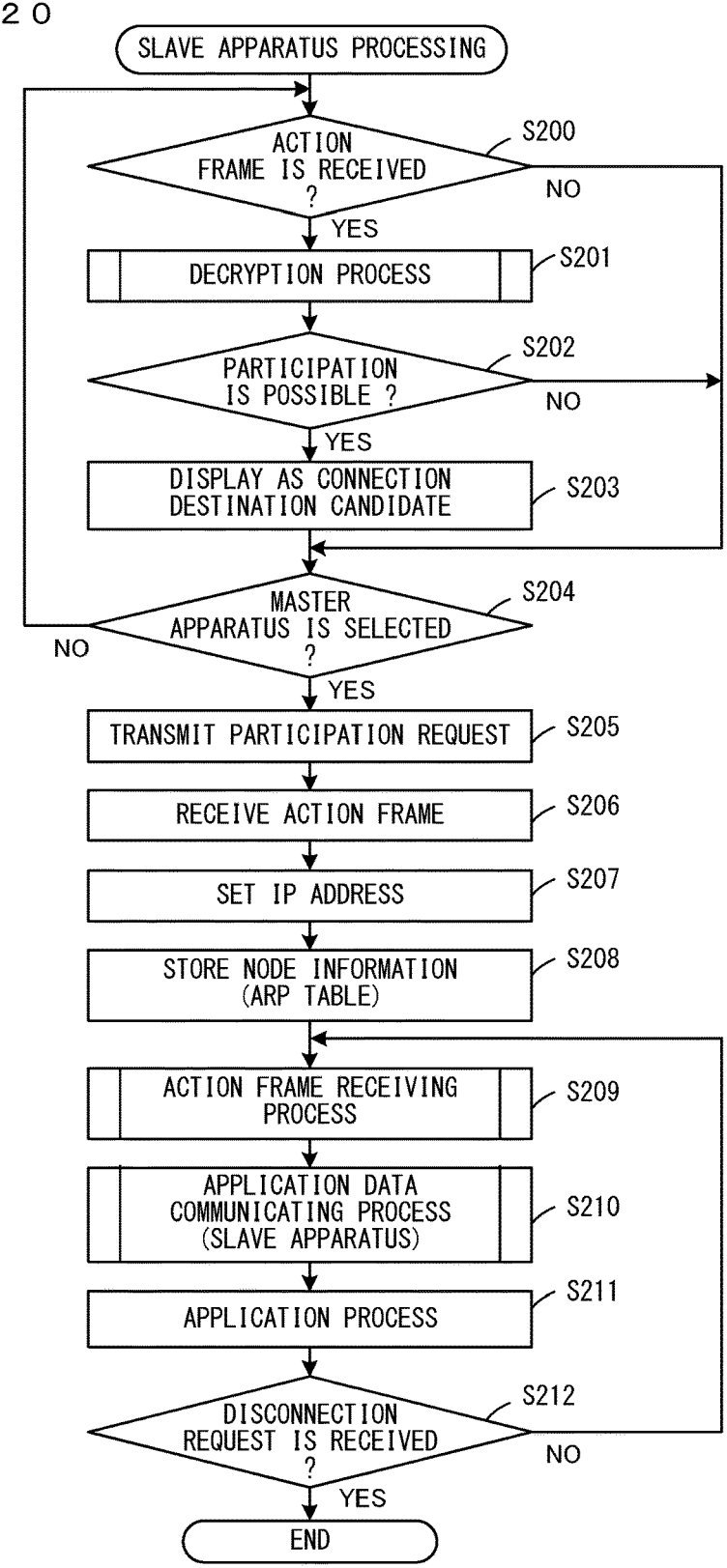
FIG. 20 is an example non-limiting flowchart illustrating details of slave apparatus processing when the information processing apparatus 10b is operating as a slave apparatus.

FIG. 20 is a flowchart illustrating, in detail, the slave apparatus processing when the information processing apparatus 10b is operating as a slave apparatus.

As shown in FIG. 20, the information processing apparatus 10b (slave apparatus) determines whether or not an action frame from a master apparatus existing around the information processing apparatus 10b is received (step S200). In this example, since the slave apparatus is not yet connected to a master apparatus, the slave apparatus receives action frames from all master apparatuses existing around the slave apparatus.

Upon receiving an action frame (step S200: YES), the slave apparatus stores, in the storage regions 201 to 204, an application ID, a scene ID, a session ID, and a counter included in the action frame, respectively, and performs a decryption process (step S201). In this example, the slave apparatus generates the same frame encryption key as that of the master apparatus on the basis of the session ID included in the received action frame, and the apparatus common key, and stores the frame encryption key in the storage region 206, and then decrypts the encryption part in the action frame by using the frame encryption key. The decryption process will be described later in detail. When receiving action frames from a plurality of master apparatuses, the slave apparatus stores, for each master apparatus, an application ID, a scene ID, a session ID, a counter, and a frame encryption key in the corresponding storage regions, and performs the decryption process.

Subsequently to step S201, the slave apparatus determines whether or not it is possible to participate in the network (communication application) of the master apparatus that has transmitted the action frame (step S202). Specifically, the slave apparatus determines whether or not it is possible to participate in the network of the master apparatus that has transmitted the action frame, on the basis of the "acceptance policy" in the received action frame, and the "disconnection request" stored in the storage region 209 thereof. The slave apparatus determines whether or not participation is possible also on the basis of the "session ID" in the action frame. The slave apparatus may determine whether or not participation is possible also on the basis of the "game ID" or the "scene ID" in the action frame.

For example, when the acceptance policy in the received action frame is the value indicating "permission", the slave apparatus determines that participation is possible, without referring to the disconnection request stored in the storage region 209. When the acceptance policy in the received action frame is the value indicating "rejection", the slave apparatus determines that participation is not possible, without referring to the disconnection request stored in the storage region 209.

For example, when the acceptance policy in the received action frame is the value indicating "white list", the slave apparatus determines whether or not the master apparatus that has transmitted the action frame is a master apparatus that has previously been connected to the slave apparatus. For example, when a slave apparatus is connected to a master apparatus, the slave apparatus stores therein information regarding the connection (IP address, MAC address, session ID, etc. of the master apparatus), and holds the information for a predetermined period even after the slave apparatus is disconnected from the master apparatus. The slave apparatus determines, on the basis of the held information, whether or not the master apparatus that has transmitted the action frame is a master apparatus that has previously been connected to the slave apparatus. When the master apparatus that has transmitted the action frame is a master apparatus that has previously been connected to the slave apparatus, the slave apparatus determines that reconnection is possible (participation is possible). When the master apparatus that has transmitted the action frame is not a master apparatus that has previously been connected to the slave apparatus, the slave apparatus determines that participation is not possible.

For example, when the acceptance policy in the received action frame is the value indicating "black list", the slave apparatus determines whether or not it is possible to participate in the network of the master apparatus that has transmitted the action frame, with reference to the disconnection request stored in the storage region 209. Specifically, in the case where the disconnection request stored in the storage region 209 is the first disconnection request, if the master apparatus that has transmitted the action frame matches the master apparatus that has transmitted the first disconnection request, the slave apparatus determines that the slave apparatus has previously been intentionally disconnected from the master apparatus and therefore cannot participate in the network of the master apparatus.

Upon determining that it is possible to participate in the network of the master apparatus that has transmitted the action frame (step S202: YES), the slave apparatus displays the master apparatus that has transmitted the action frame, as a connection destination candidate (step S203). For example, on the display section 14, the slave apparatus displays: the IP address, the MAC address, and the user name of the master apparatus; the communication application name and the scene name executed by the master apparatus; information of other participating slave apparatuses; and the like. Further, when the slave apparatus receives action frames from a plurality of master apparatuses and determines that it is possible to participate in the networks of the master apparatuses that have transmitted the action frames (step S202: YES), the slave apparatus displays the plurality of master apparatuses as connection destination candidates. The user of the slave apparatus selects one master apparatus from the list of the connection destination candidates displayed. When the master apparatus that has transmitted the action frame is a master apparatus that has previously been connected to the slave apparatus, the slave apparatus may display a screen that allows the user to select whether or not to reconnect the slave apparatus to the master apparatus. Alternatively, the slave apparatus may execute the process in step S205 and automatically transmit a participation request, without displaying the screen that allows the user to select whether or not to reconnect the slave apparatus to the master apparatus.

Subsequently, the slave apparatus determines whether or not any master apparatus is selected from the list of the connection destination candidates displayed in step S203 (step S204). Upon determining that no master apparatus is selected (step S204: NO), the slave apparatus again executes the process in step S200.

Upon determining that a master apparatus is selected (step S204: YES), the slave apparatus transmits a participation request to the selected master apparatus (step S205). Subsequently, the slave apparatus receives an action frame from the master apparatus to which the participation request has been transmitted (step S206). Upon receiving the action frame, the slave apparatus decrypts the encryption part in the action frame by using the frame encryption key stored in the storage region 206 and the counter included in the action frame.

Then, the slave apparatus extracts the IP address corresponding to the MAC address thereof from the node information included in the received action frame, and sets the IP address therein (step S207). Next, the slave apparatus stores, in the storage region 208, the node information (ARP table) included in the received action frame (step S208).

Through the processes in steps S200 to S208 described above, the slave apparatus becomes able to participate in the network of the master apparatus and execute the communication application. The processes in steps S209 to S212 are processes to be performed after the slave apparatus is connected to the master apparatus, and the slave apparatus repeatedly executes the processes in steps S209 to S212 at predetermined time intervals.

Specifically, after the process in step S208, the slave apparatus performs an action frame receiving process (step S209). In step S209, the slave apparatus receives the action frame that is transmitted at predetermined time intervals from the master apparatus to which the slave apparatus is connected. The action frame receiving process in step S209 will be described later in detail.

Subsequently, the slave apparatus performs an application data communicating process (slave apparatus) (step S210). The application data communicating process (slave apparatus) is a process of transmitting and receiving application data while the communication application is being executed between the master apparatus and the slave apparatus. The application data communicating process (slave apparatus) in step S210 will be described later in detail.

Subsequently to step S210, the slave apparatus executes an application process (step S211). In step S211, as in step S117 shown in FIG. 15, the slave apparatus executes the application process on the basis of the application data received in step S210. For example, the slave apparatus, in step S210, receives operation data according to an input performed to the input section 13 of another apparatus, and stores the received operation data in the storage region 211. The slave apparatus executes the application process on the basis of the operation data, of the other apparatus, stored in the storage region 211. Further, the slave apparatus stores, in the storage region 210, operation data according to an input performed to the input section 13 thereof, and executes the application process on the basis of the operation data. Further, the slave apparatus causes the display section 14 to display an image according to the result of the application process.

When having executed the process in step S211, the slave apparatus determines whether or not a disconnection request from the master apparatus is received (step S212). Upon determining that a disconnection request from the master apparatus is received (step S212: YES), the slave apparatus stores the disconnection request in the storage region 209, and ends the processing shown in FIG. 20. On the other hand, upon determining that no disconnection request is received from the master apparatus (step S212: NO), the slave apparatus again executes the process in step S209.

The slave apparatus ends the processing shown in FIG. 20 when the master apparatus notifies the slave apparatus that the communication application is ended, or when the user of the slave apparatus instructs to withdraw from the communication application. Further, the slave apparatus ends the processing shown in FIG. 20 when communication with the master apparatus is not performed for a predetermined period.

(Decryption Process)

Figure 21:
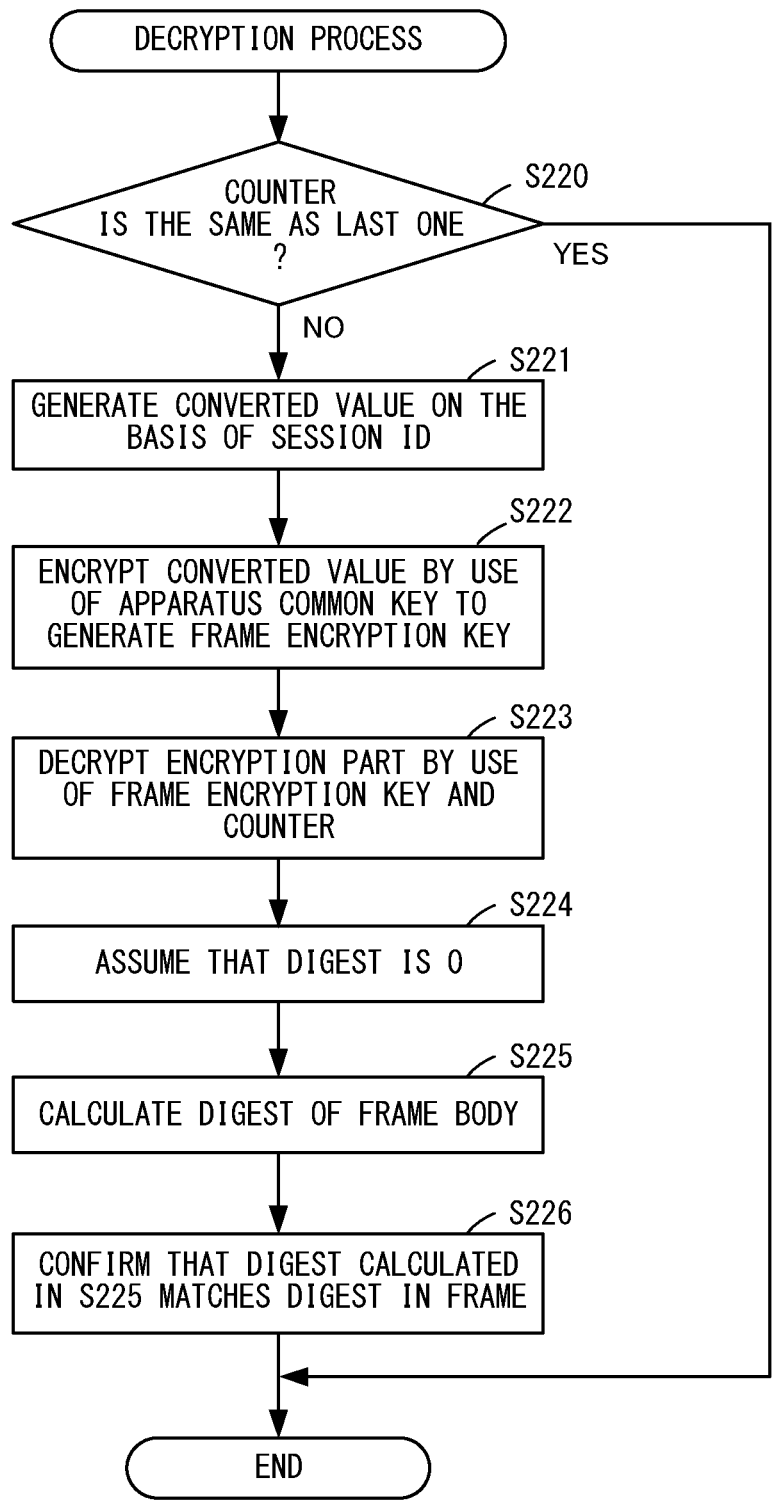
FIG. 21 is an example non-limiting flowchart illustrating details of a decryption process at step S201 in FIG. 20.

Next, the decryption process in step S201 shown in FIG. 20 will be described in detail. FIG. 21 is a flowchart illustrating, in detail, the decryption process in step S201 in FIG. 20.

As shown in FIG. 21, the slave apparatus determines whether or not the counter in the currently received action frame is the same as the counter in the action frame received last time (step S220). When the slave apparatus firstly executes the process in step S220, the slave apparatus always determines as NO in step S220. Upon determining that the current counter is the same as the last counter (step S220: YES), the slave apparatus ends the process in FIG. 21.

Upon determining that the current counter is different from the last counter (step S220: NO), the slave apparatus generates converted values on the basis of the session ID included in the received action frame (step S221). Specifically, the slave apparatus converts the application ID, the scene ID, and the session ID included in the action frame, by using a predetermined function, thereby generating converted values.

Next, the slave apparatus encrypts the converted values generated in step S221 by using the apparatus common key, thereby generating a frame encryption key (step S222). The slave apparatus stores the generated frame encryption key in the storage region 206. The generated frame encryption key is the same as the frame encryption key generated in the master apparatus.

Subsequently to step S222, the slave apparatus decrypts the encryption part in the received action frame, by using the frame encryption key generated in step S222 and the counter included in the action frame (step S223). Subsequently, the slave apparatus assumes that the value of the "digest" is a fixed value (step S224).

Next, the slave apparatus calculates the message digest of the frame body shown in FIG. 11 which has been decrypted (step S225). Specifically, the slave apparatus calculates a hash value of the frame body by using a predetermined hash function, thereby calculating the digest.

Then, the slave apparatus confirms that the digest calculated in step S225 matches the digest included in the received action frame (step S226). If the two digest values do not match, there is a possibility that the data has been altered. Therefore, the slave apparatus discards the received action frame.

(Action Frame Receiving Process)

Figure 22:
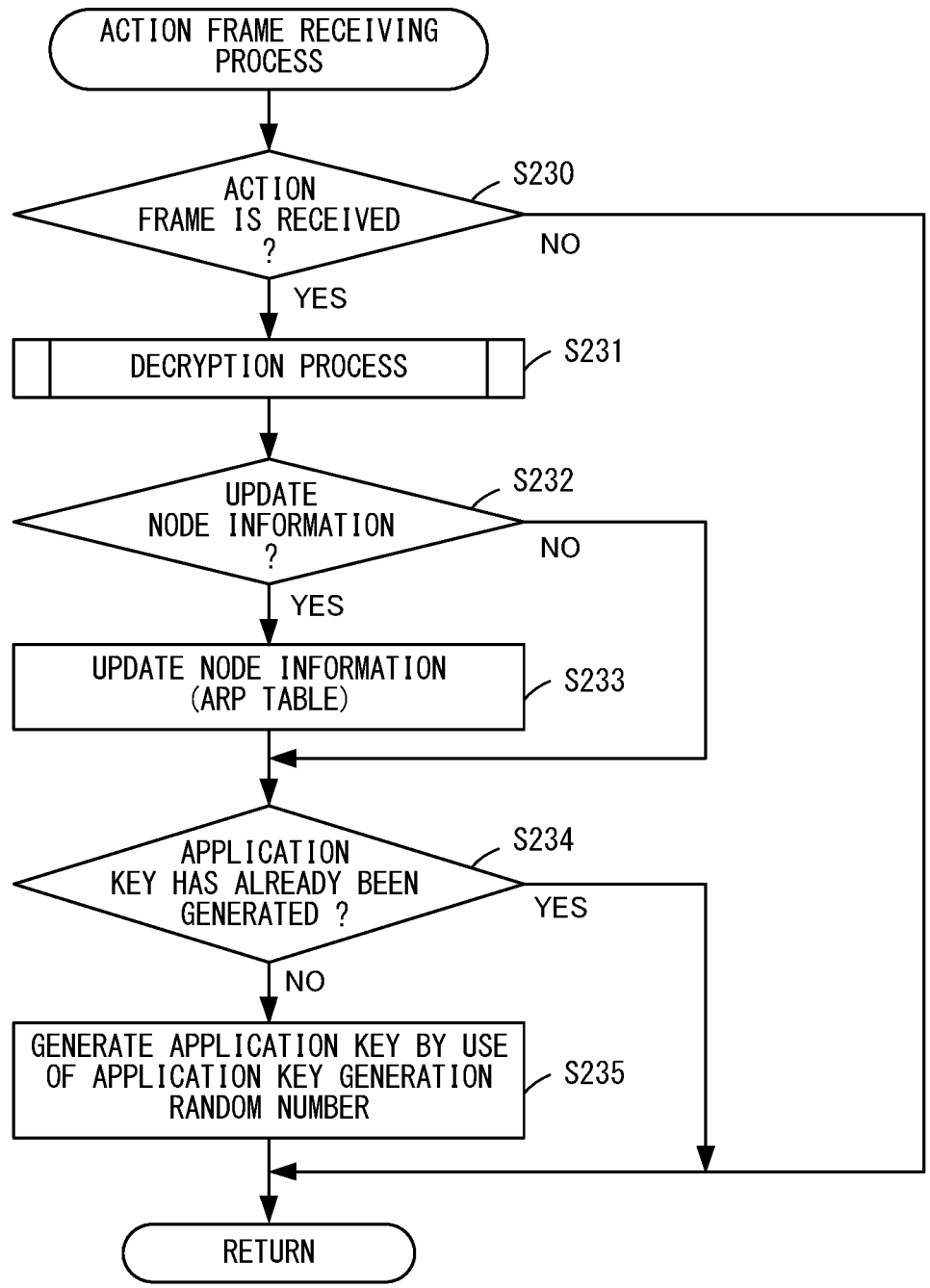
FIG. 22 is an example non-limiting flowchart illustrating details of an action frame receiving process at step S209 in FIG. 20.

Next, the action frame receiving process in step S209 shown in FIG. 20 will be described in detail. FIG. 22 is a flowchart illustrating, in detail, the action frame receiving process in step S209 shown in FIG. 20.

As shown in FIG. 22, the slave apparatus determines whether or not an action frame is received from the master apparatus to which the slave apparatus is connected (step S230). When the slave apparatus receives an action frame from a master apparatus to which the slave apparatus is not connected, the slave apparatus discards the action frame.

Upon determining that the slave apparatus receives an action frame from the master apparatus to which the slave apparatus is connected (step S230: YES), the slave apparatus performs a decryption process for the action frame (step S231). This process is the same as the decryption process shown in FIG. 21.

Subsequently, the slave apparatus compares the node information stored in the storage region 208 with the node information included in the action frame, thereby determining whether or not the node information is updated (step S232). Upon determining that the node information is updated (step S232: YES), the slave apparatus stores, in the storage region 208, the node information included in the received action frame, thereby updating the node information (ARP table) (step S233).

When having executed the process in step S233 or when having determined as "NO" in step S232, the slave apparatus determines whether or not an application key has already been generated (step S234). Upon determining that an application key has already been generated (step S234: YES), the slave apparatus ends the processing shown in FIG. 22.

Upon determining that an application key has not yet been generated (step S234: NO), the slave apparatus generates an application key by using the application key generation random number included in the received action frame and the pass phrase in the application program (step S235). The application key generated in step S235 is the same as the application key generated in the master apparatus in step S113 described above. The slave apparatus stores the generated application key in the storage region 207. This is the end of the processing shown in FIG. 22.

(Application Data Communicating Process (Slave Apparatus))

Figure 23:
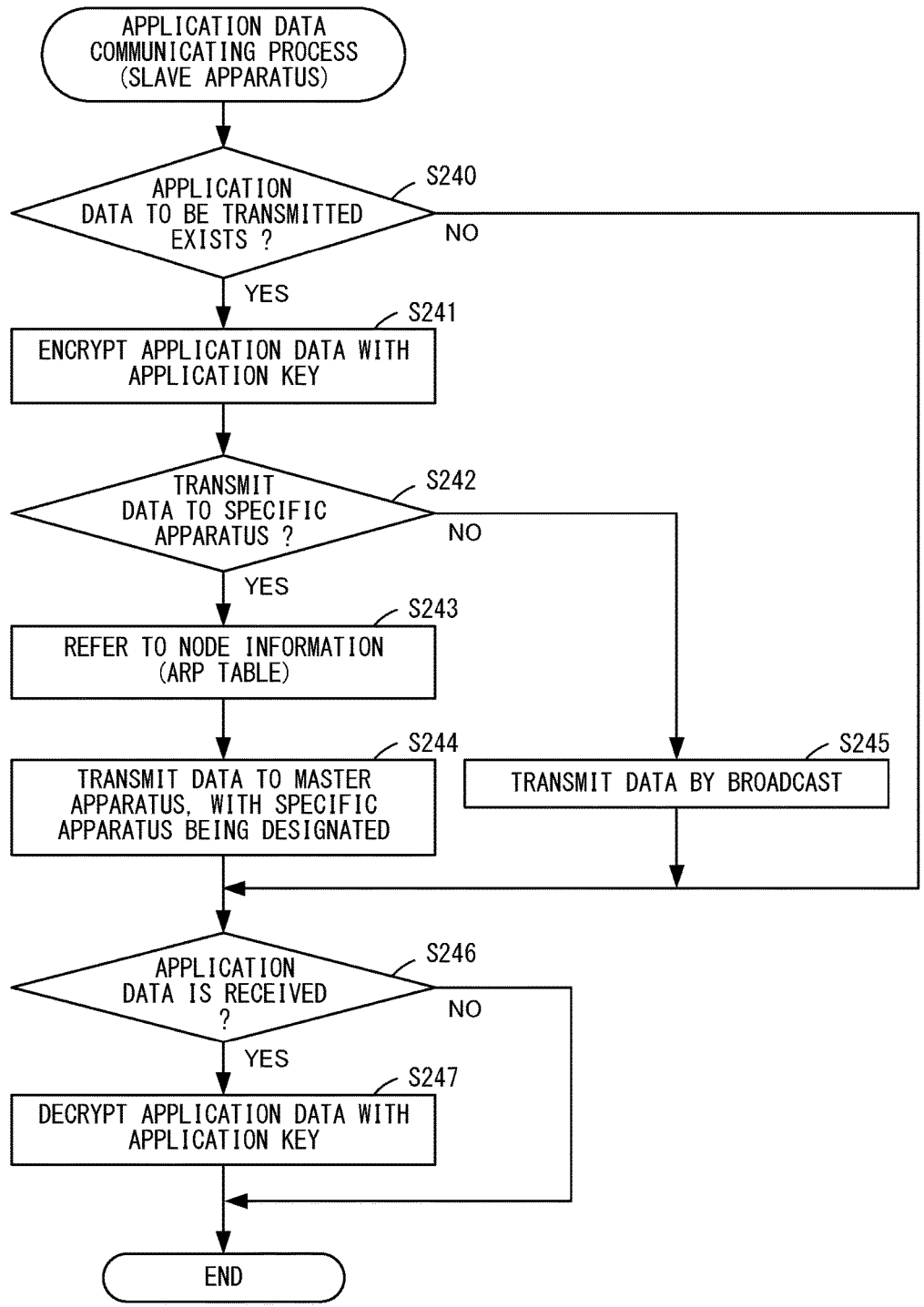
FIG. 23 is an example non-limiting flowchart illustrating details of an application data communicating process (slave apparatus) at step S210 in FIG. 20.

Next, the application data communicating process performed in a slave apparatus will be described in detail. FIG. 23 is a flowchart illustrating, in detail, the application data communicating process (slave apparatus) in step S210 shown in FIG. 20.

As shown in FIG. 23, a slave apparatus determines whether or not there is application data to be transmitted from the slave apparatus to another apparatus (another slave apparatus or a master apparatus) (step S240). For example, when there is a transmission request for application data (e.g., operation data) from an application being executed in the slave apparatus, the slave apparatus determines that there is application data to be transmitted.

Upon determining that there is application data to be transmitted (step S240: YES), the slave apparatus encrypts the application data transferred from the application, by using the application key stored in the storage region 207 (step S241). As described above, the application key has been generated on the basis of the application key generation random number in step S235 and stored in the storage region 207.

Subsequently to step S241, the slave apparatus determines whether or not to transmit the data to a specific apparatus (another slave apparatus or a master apparatus) (step S242). Whether the application data is to be transmitted to a specific apparatus by unicast or to be transmitted to all the apparatuses by broadcast is determined by the application. At this time, the application designates the IP address of the specific apparatus to which the data is transmitted.

Upon determining to transmit the data to the specific apparatus (step S242: YES), the slave apparatus refers to the node information (ARP table) stored in the storage region 208 (step S243). Then, the slave apparatus designates the MAC address corresponding to the IP address designated by the application, and transmits the data encrypted in step S241 to the specific apparatus (step S244). Specifically, the slave apparatus transmits a data frame, with the MAC address of the specific apparatus being designated as a destination address, and the MAC address of the master apparatus being designated as a receiver.

On the other hand, when having determined as NO in step S242, the slave apparatus transmits the data encrypted in step S241 by broadcast (step S245). Specifically, the slave apparatus transmits the data frame, with the broadcast address being designated as a destination address.

When having executed the process in step S244, or when having executed the process in step S245, or when having determined as NO in step S240, the slave apparatus determines whether or not application data from another apparatus is received (step S246). Upon determining that the application data is received (step S246: YES), the slave apparatus decrypts the received data by using the application key stored in the storage region 207 (step S247). Then, the slave apparatus stores the decrypted application data in the storage unit. This is the end of the processing shown in FIG. 23.

As described above, in the present embodiment, among a plurality of information processing apparatuses (e.g., 10a to 10c), one information processing apparatus (10a) serves as a master apparatus while the other information processing apparatuses (10b and 10c) serve as slave apparatuses, and a communication application is executed among the plurality of information processing apparatuses.

The processes in the flowcharts described above are merely examples. For example, the order of the steps may be changed, other steps may be added, and some of the steps may be omitted.

The master apparatus assigns an IP address to the slave apparatus (step S134), and transmits the node information (ARP table) to the slave apparatus (step S135, step S130). In the node information (ARP table), for each of all the apparatuses connected to the network, the IP address and the MAC address are associated with each other.

For example, when the master apparatus, the slave apparatus 1, and the slave apparatus 2 are connected to the network, the ARP table (management table) in which the IP address of the master apparatus is associated with the MAC address of the master apparatus, the IP address of the slave apparatus 1 is associated with the MAC address of the slave apparatus 1, and the IP address of the slave apparatus 2 is associated with the MAC address of the slave apparatus 2, is transmitted from the master apparatus to the slave apparatus 1 and the slave apparatus 2 (step S233). When the slave apparatus transmits data to a certain apparatus, the slave apparatus refers to the ARP table received from the master apparatus (step S243) to specify the MAC address of the certain apparatus, and transmits the data (step S244).

Thus, when a slave apparatus transmits data to another slave apparatus, the slave apparatus can transmit data to the other slave apparatus without inquiring of surrounding apparatuses about the MAC address (physical address; also referred to as hardware address) corresponding to the IP address (logical address; also referred to as software address). Therefore, the slave apparatus can transmit a frame to the designated apparatus, without transmitting an extra frame to the space, thereby avoiding congestion of electric waves. In addition, delay in transmitting data can be avoided.

In the present embodiment, upon receiving a participation request from a slave apparatus, a master apparatus generates an IP address of the slave apparatus, and transmits, to the slave apparatus, the ARP table in which the MAC address and the IP address of the slave apparatus are associated with each other. The slave apparatus refers to the ARP table transmitted from the master apparatus, and sets, as its own IP address, the IP address associated with the MAC address of the slave apparatus. The master apparatus generates the IP address of the slave apparatus without transmitting a frame for confirming no duplication of the IP address, and the slave apparatus sets its own IP address without transmitting a frame for confirming no duplication of the IP address. Therefore, a network is readily constructed among the plurality of apparatuses, and the communication application can be readily started among the plurality of apparatuses.

In the present embodiment, when a slave apparatus is connected to a master apparatus, the table in which, for each apparatus, the IP address and the MAC address are associated with each other is transmitted from the master apparatus to the slave apparatus. Therefore, the slave apparatus can hold the table in which the IP address and the MAC address of an apparatus, with which the slave apparatus has never communicated before, are associated with each other. For example, in the case where the slave apparatus 2 is newly connected to the master apparatus while the master apparatus and the slave apparatus 1 are connected to each other, when the slave apparatus 1 and the slave apparatus 2 receive an action frame transmitted from the master apparatus at predetermined time intervals, the slave apparatus 1 can hold the IP address and the MAC address of the slave apparatus 2 and the slave apparatus 2 can hold the IP address and the MAC address of the slave apparatus 1 although the slave apparatus 1 and the slave apparatus 2 have never communicated with each other before. This table is always included in the action frame and transmitted at the predetermined time intervals. Therefore, all the apparatuses (master apparatus and slave apparatuses) connected to the network can always hold the latest table.

In the present embodiment, when a master apparatus is set, a session ID (identification information) for and unique to communication between the master apparatus and a slave apparatus is randomly generated (step S112), and a frame encryption key is generated by using an apparatus common key and the session ID (step S124). The frame encryption key is generated by using the identification information unique to communication between the master apparatus and the slave apparatus, and therefore, is changed for each communication between the master apparatus and the slave apparatus. Thus, the frame encryption key is prevented from being decrypted. Even if the frame encryption key is decrypted, another frame encryption key is generated when communication between the master apparatus and the slave apparatus, which has been started at a certain timing, is ended and communication between the master apparatus and the slave apparatus is started at another timing. Therefore, data can be safely transmitted in the communication started at the other timing.

The apparatus common key is a common key stored in the master apparatus and each slave apparatus in advance, and is a secure key written in hardware of the master apparatus and hardware of each slave apparatus. Therefore, the apparatus common key is less likely to be read by malicious parties, and can be safely used for generating the frame encryption key.

In the present embodiment, the encryption part in the action frame which is broadcast from the master apparatus at predetermined time intervals is encrypted by using the frame encryption key, and the encryption part includes the application key generation random number for generating the application key common to applications. A slave apparatus can receive an action frame from a master apparatus even when it is not connected to the master apparatus, and therefore can know existence of a master apparatus around the slave apparatus and what communication application the master apparatus executes. On the other hand, since application data for a communication application is encrypted by using an application key, when a slave apparatus is not connected to the master apparatus and does not generate an application key, the slave apparatus cannot know the content of an application executed between the master apparatus and another slave apparatus. Therefore, a slave apparatus that is not participating in the communication application is prevented from transmitting wrong data to a plurality of apparatuses executing the communication application.

Since the application key generation random number for generating an application key is encrypted by using the frame encryption key, another apparatus having no apparatus common key cannot decrypt the application key. Therefore, the plurality of information processing apparatuses 10 can safely execute the communication application.

In the present embodiment, the acceptance policy is included in the action frame. The acceptance policy includes: "permission" indicating that a master apparatus always permits connection of a slave apparatus; and "rejection" indicating that a master apparatus always rejects connection of a slave apparatus. Further, in addition to the "permission" and the "rejection", the acceptance policy includes: "white list" indicating that a master apparatus basically rejects connection of a slave apparatus but conditionally permits connection of a slave apparatus; and "black list" indicating that a master apparatus basically permits connection of a slave apparatus but conditionally rejects connection of a slave apparatus. The acceptance policy of "white list" indicates that, when a slave apparatus, which has once been connected to a master apparatus, is disconnected due to deteriorated communication status or the like, the master apparatus permits reconnection of the slave apparatus. A slave apparatus that receives an action frame including such an acceptance policy can attempt reconnection to the master apparatus, and can again participate in the communication application in which the slave apparatus has once participated. The acceptance policy of "black list" indicates that, when a slave apparatus that has once been connected to a master apparatus is intentionally rejected by the master apparatus and disconnected from the master apparatus, the master apparatus rejects reconnection of the slave apparatus. Since the slave apparatus that has received the action frame including such an acceptance policy never attempts reconnection to the master apparatus, useless communications can be inhibited.

In the present embodiment, a master apparatus can transmit, to slave apparatuses, various disconnection requests according to different reasons of disconnection. For example, when the user of the master apparatus intentionally disconnect a slave apparatus, a first disconnection request including the reason for the intentional disconnection is transmitted from the master apparatus to the slave apparatus. On the other hand, when the master apparatus shifts to the sleep mode or the like, a second disconnection request including the reason for disconnection is transmitted from the master apparatus to the slave apparatus. The slave apparatus can determine whether or not to transmit a participation request to the master apparatus, on the basis of the disconnection request received from the master apparatus, and the acceptance policy included in the action frame from the master apparatus. Since the slave apparatus determines whether or not to transmit a participation request on the basis of the reason for disconnection, the slave apparatus can be precisely controlled on the basis of the reason for disconnection, thereby preventing transmission of useless frames, and reducing the processing load on the master apparatus side. Further, the master apparatus can control the operation of the slave apparatus without transmitting, to the slave apparatus, the black list and the white list themselves which are stored in the master apparatus, thereby preventing an increase in traffic.

In the present embodiment, the data described above are included in an action frame when the action frame is transmitted. In another embodiment, instead of the action frame, for example, a beacon including the data described above may be transmitted. In this case, a frame encryption key is generated on the basis of the apparatus common key and the session ID, and the data encrypted by using the frame encryption key is transmitted by the beacon. Alternatively, the data described above may be transmitted by using an action frame and a beacon.

In the embodiment described above, an action frame for connection is broadcast from the master apparatus at predetermined time intervals, and the master apparatus and a slave apparatus are connected to each other upon reception of the action frame by the slave apparatus. In another embodiment, a slave apparatus may broadcast a probe request, and a master apparatus and the slave apparatus may be connected to each other upon reception of the probe request by the master apparatus.

In the embodiment described above, an ARP table, in which a variable IP address set in an apparatus is associated with a MAC address unique to the apparatus, is generated and transmitted from a master apparatus to a slave apparatus. In another embodiment, for example, a table, in which a variable user name (host name) set in an apparatus is associated with an MAC address of the apparatus, may be generated and transmitted from a master apparatus to a slave apparatus. That is, a table, in which a variable logical address set in an apparatus is associated with a physical address unique to the apparatus, may be generated and transmitted from a master apparatus to a slave apparatus. In this case, an application of each apparatus designates the logical address (user name, host name, IP address, or the like) set in the apparatus, and the wireless communication section 15 of each apparatus obtains, with reference to the table, the physical address corresponding to the logical address designated by the application, and transmits the data, with the physical address being designated.

In the embodiment described above, a game application is performed as an example of a communication application. However, the communication application is not limited to the game application, and any application may be executed among a plurality of apparatuses.

The present embodiment has been described above, but the above description is merely an example of the present embodiment, and various modifications and equivalent arrangements may be implemented.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A wireless communication system including a plurality of information processing apparatuses each being configured to wirelessly communicate, the wireless communication system including a first information processing apparatus and a second information processing apparatus, wherein:
   the first information processing apparatus includes at least one first processor configured to at least:
      transmit information for establishing a connection with the second information processing apparatus;
      establish connection between the first information processing apparatus and the second information processing apparatus; and
      transmit a disconnection request to the second information processing apparatus being connected thereto,
   the second information processing apparatus includes at least one second processor configured to at least:

receive, from the first information processing apparatus, the information for establishing the connection;
establish connection between the first information processing apparatus and the second information processing apparatus;
receive the disconnection request from the first information processing apparatus; and
determine whether to reconnect to the first information processing apparatus, based on the disconnection request and the information for establishing the connection, after having been disconnected from the first information processing apparatus,
the disconnection request has one of a plurality of different disconnection request types,
the second information processing apparatus further includes a data store configured to store information regarding received disconnection requests,
information indicating conditional permission/rejection of connection is includable with the transmission of the information for establishing the connection, and
the at least one second processor of the second information processing apparatus is further configured to at least decline to request reconnection to the first information processing apparatus based on the stored information regarding received disconnection requests and whether information indicating conditional permission/rejection of connection is included with the transmission of the information for establishing the connection.

2. The wireless communication system according to claim 1, wherein the information for establishing the connection is broadcast by the at least one first processor of the first information processing apparatus.

3. The wireless communication system according to claim 1, wherein the at least one second processor of the second information processing apparatus is further configured to:
cause a display to display connection destination candidates, based on the information for establishing the connection that has been received, and
upon determining not to reconnect to the first information processing apparatus, cause the display to display information of information processing apparatuses each having transmitted the information for establishing the connection, excluding the first information processing apparatus.

4. The wireless communication system according to claim 1, wherein upon determining not to reconnect to the first information processing apparatus, a reconnection request to the first information processing apparatus is not automatically transmitted by the second information processing apparatus.

5. The wireless communication system according to claim 1, wherein the at least one first processor of the first information processing apparatus is further configured to:
repeatedly transmit the information for establishing the connection, and
transmit the disconnection request when a disconnection condition is satisfied.

6. The wireless communication system according to claim 1, wherein the at least one first processor of the first information processing apparatus is further configured to transmit first information as the information for establishing the connection before the disconnection request is transmitted, and transmit second information different from the first information, as the information for establishing the connection, after the disconnection request is transmitted.

7. The wireless communication system according to claim 1, wherein the at least one first processor of the first information processing apparatus is further configured to transmit the disconnection request in accordance with an operation performed by a user of the first information processing apparatus.

8. The wireless communication system according to claim 1, wherein the at least one first processor of the first information processing apparatus is further configured to transmit, in connection with the information for establishing the connection, any one of information indicating permission of connection, information indicating rejection of connection, and information indicating conditional permission/rejection of connection.

9. The wireless communication system according to claim 8, wherein the at least one second processor of the second information processing apparatus is further configured to determine whether to reconnect to the first information processing apparatus, based on the disconnection request and the information indicating conditional permission/rejection of connection.

10. The wireless communication system according to claim 1, wherein:
the at least one second processor of the second information processing apparatus is further configured to transmit a connection request to the first information processing apparatus, upon determining to reconnect to the first information processing apparatus,
the at least one first processor of the first information processing apparatus is further configured to store a list of information processing apparatuses to which the first information processing apparatus has transmitted the disconnection request, and
the at least one first processor of the first information processing apparatus is further configured to determine whether the second information processing apparatus having transmitted the connection request is included in the list, and reject reconnection to the second information processing apparatus in response to the second information processing apparatus being included in the list.

11. The wireless communication system according to claim 1, wherein:
the first information processing apparatus and the second information processing apparatus each store thereto connection identification information for identifying the connection established, and
the at least one second processor of the second information processing apparatus is further configured to determine whether to reconnect to the first information processing apparatus, based on the connection identification information as well as the disconnection request and the information for establishing the connection.

12. The wireless communication system according to claim 1, wherein a first disconnection request type corresponds to an intentional rejection of connection and a second disconnection request type relates to a state of the second information processing apparatus.

13. The wireless communication system according to claim 1, wherein the determination of whether to reconnect to the first information processing apparatus is based on the type of the received disconnection request.

14. The wireless communication system according to claim 1, wherein information indicating conditional permission/rejection of connection is included with the transmission of the information for establishing the connection.

15. The wireless communication system according to claim 1, wherein the at least one second processor of the second information processing apparatus is further configured to determine whether to reconnect to the first information processing apparatus, based on the disconnection request and the information indicating conditional permission/rejection of connection.

16. A communication method performed in a wireless communication system including a plurality of information processing apparatuses each being configured to wirelessly communicate, the wireless communication system including a first information processing apparatus and a second information processing apparatus, the method comprising the second information processing apparatus:
   receiving, from the first information processing apparatus, information for establishing a connection with the second information processing apparatus;
   establishing connection between the first information processing apparatus and the second information processing apparatus;
   receiving a disconnection request from the first information processing apparatus being connected thereto; and
   determining whether to reconnect to the first information processing apparatus, based on the disconnection request and the information for establishing the connection, after having been disconnected from the first information processing apparatus;
   wherein the disconnection request has one of a plurality of different disconnection request types;
   wherein the second information processing apparatus further includes a data store configured to store information regarding received disconnection requests;
   wherein information indicating conditional permission/rejection of connection is includable with the transmission of the information for establishing the connection; and further comprising:
   declining to request reconnection to the first information processing apparatus based on the stored information regarding received disconnection requests and whether information indicating conditional permission/rejection of connection is included with the transmission of the information for establishing the connection.

17. An information processing apparatus including a wireless transceiver and at least one processor configured to at least:
   receive, from another information processing apparatus, information for establishing a connection;
   establish connection with the other information processing apparatus;
   receive a disconnection request from the other information processing apparatus while being connected to the other information processing apparatus; and
   determine whether to reconnect to the other information processing apparatus, based on the disconnection request and the information for establishing the connection, after having been disconnected from the other information processing apparatus;
   wherein the disconnection request has one of a plurality of different disconnection request types;
   wherein the information processing apparatus further includes a data store configured to store information regarding received disconnection requests;
   wherein information indicating conditional permission/rejection of connection is includable with the transmission of the information for establishing the connection; and
   wherein the at least one processor is further configured to at least decline to request reconnection to the other processing apparatus based on the stored information regarding received disconnection requests and whether information indicating conditional permission/rejection of connection is included with the transmission of the information for establishing the connection.

18. A non-transitory computer readable storage medium having stored therein an information processing program to be executed by a computer of an information processing apparatus having a wireless transceiver, the program when executed causing the computer to at least:
   receive, from another information processing apparatus, information for establishing a connection;
   establish connection with the other information processing apparatus;
   receive a disconnection request from the other information processing apparatus while being connected to the other information processing apparatus; and
   determine whether to reconnect to the other information processing apparatus, based on the disconnection request and the information for establishing the connection, after having been disconnected from the other information processing apparatus;
   wherein the disconnection request has one of a plurality of different disconnection request types;
   wherein the information processing apparatus further includes a data store configured to store information regarding received disconnection requests;
   wherein information indicating conditional permission/rejection of connection is includable with the transmission of the information for establishing the connection; and
   the program, when executed, further causing the computer to at least decline to request reconnection to the other information processing apparatus based on the stored information regarding received disconnection requests and whether information indicating conditional permission/rejection of connection is included with the transmission of the information for establishing the connection.

* * * * *